United States Patent [19]

Takahashi et al.

[11] Patent Number: 4,905,143

[45] Date of Patent: Feb. 27, 1990

[54] ARRAY PROCESSOR AND CONTROL METHOD THEREOF

[75] Inventors: Junichi Takahashi; Sanshiro Hattori; Takashi Kimura; Atsushi Iwata, all of Kanagawa, Japan

[73] Assignee: Nippon Telegraph and Telephone Public Company, Tokyo, Japan

[21] Appl. No.: 220,970

[22] Filed: Jun. 14, 1988

Related U.S. Application Data

[63] Continuation of Ser. No. 705,376, Feb. 25, 1985, abandoned.

[30] Foreign Application Priority Data

Feb. 27, 1984 [JP] Japan ................................ 59-34450
May 16, 1984 [JP] Japan ................................ 59-96656

[51] Int. Cl.[4] .................... G06F 15/16; G06F 15/00
[52] U.S. Cl. .................................................. 364/200
[58] Field of Search .............................. 364/200, 900

[56] References Cited

U.S. PATENT DOCUMENTS

| | | | |
|---|---|---|---|
| 3,287,703 | 11/1966 | Slotnick | 364/200 |
| 3,544,973 | 12/1970 | Borck . | |
| 3,582,899 | 6/1971 | Semmelhaak | 364/200 |
| 3,970,993 | 7/1976 | Finnila | 364/200 |
| 4,065,808 | 12/1977 | Schomberg et al. | 364/200 |
| 4,270,169 | 5/1981 | Reddaway | 364/200 |
| 4,270,170 | 5/1981 | Hunt et al. | 364/200 |
| 4,314,349 | 2/1982 | Batcher | 364/900 |
| 4,334,305 | 6/1982 | Giradi | 364/200 |
| 4,380,046 | 4/1983 | Fung | 364/200 |
| 4,384,273 | 5/1983 | Ackland et al. | 364/900 |
| 4,428,048 | 1/1984 | Berlin, Jr. | 364/200 |
| 4,466,064 | 8/1984 | Martin | 364/200 |
| 4,467,422 | 8/1984 | Hunt | 364/200 |
| 4,509,187 | 4/1985 | Ackland et al. | 364/200 |
| 4,533,993 | 8/1985 | McCanny et al. | 364/200 |
| 4,541,048 | 9/1985 | Propster et al. | 364/736 |
| 4,628,481 | 12/1986 | Reddaway | 364/900 |
| 4,739,474 | 4/1988 | Holsztynski | 364/200 |
| 4,739,476 | 4/1988 | Fiduccia | 364/200 |
| 4,783,738 | 11/1988 | Li et al. | 364/200 |

FOREIGN PATENT DOCUMENTS 0085435 3/1982 European Pat. Off. .
130409 1/1989 Netherlands .
2062914 5/1981 United Kingdom .

OTHER PUBLICATIONS

Ackland et al, "Array Configurations for Dynamic Time Warping," IEEE Conference on Acoustics Speech & Signal Proc. pp. 119-127, Feb./1984.

D. J. Burr et al, A High Speed Array Computer for Dynamic Time Warping, Bell Laboratories, N.J., IEEE 1981 pp. 471-474.

Bryan Ackland et al, An Integrated Multiprocessing Array for Time Warp Pattern Matching, Bell Laboratories, N.J., IEEE 1981 pp. 197-203.

N. H. E. Weste et al, Speech Processing, IEEE 1982, Bell laboratories in New Jersey, pp. 274-275.

VLSI Structures for Speech Analysis and Pattern Recognition, IEEE Proceedings Jun. 14-17, 1982, pp. 692-697.

Primary Examiner—Gareth D. Shaw
Assistant Examiner—Viet Q. Nguyen
Attorney, Agent, or Firm—Cushman, Darby & Cushman

[57] ABSTRACT

An array processor comprising multiplexers, plural processing elements connected through the multiplexers in the form of a ring and a control unit for controlling the multiplexers and the processing elements. Each of the processing elements is connected to an input vector data bus via the multiplexer and directly to an I/O data bus, so that two types of input vector data are inputted to the processing element simultaneously. Flags indicating a position of respective vector data are added to each one of input vector data, series composed of a combination of plural types of input vector data series. The processing element judges a processing status of the processing element to control a selection of the input vector data bus or the transfer path, data transfer between the processing elements, or data input/output to/from the I/O bus, so that the overall array processor executes autonomous control of all the combinations of the vector data of the two types of input vector data series. The array processor realizes parallel processing of pattern matching computation based upon dynamic time warping with a high efficiency and thus realizes a highefficiency utilization of hardware resources including processing elements and network.

5 Claims, 22 Drawing Sheets

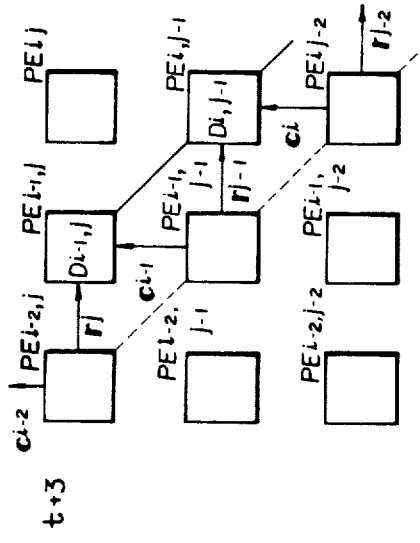
FIG. 4A
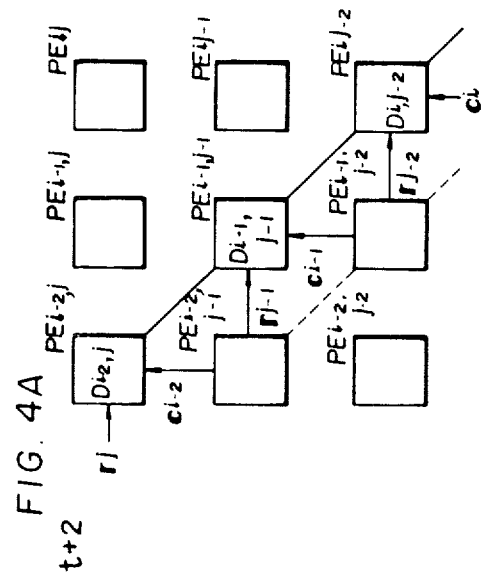
FIG. 5A
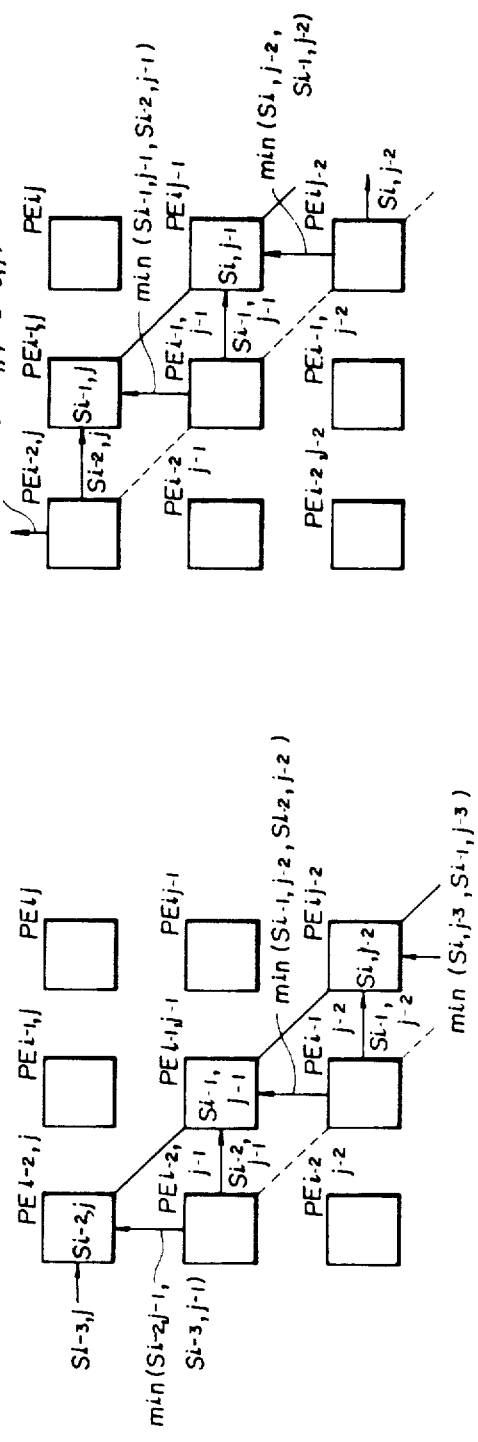
FIG. 5B
FIG. 4B

FIG. 12

| | Input Data | Head | Tail | Transfer Timing |
|---|---|---|---|---|
| R1 | $r_1^1$ | 1 | 0 | 0 |
| | $r_2^1$ | 0 | 0 | 0 |
| | ⋮ | 0 | 0 | 0 |
| | $r_{N1}^1$ | 0 | 1 | 0 |
| R2 | $r_1^2$ | 1 | 0 | 0 |
| | ⋮ | 0 | 0 | 0 |
| | $r_{N\ell-1}^{\ell-1}$ | 0 | 1 | 0 |
| Rℓ | $r_1^\ell$ | 1 | 0 | 0 |
| | ⋮ | 0 | 0 | 0 |
| | $r_{N\ell-n+1}^\ell$ | 0 | 0 | 1 |
| | ⋮ | 0 | 0 | 1 |
| | $r_{N\ell}^\ell$ | 0 | 1 | 1 |

64, 61, 62, 63

F I G. 18
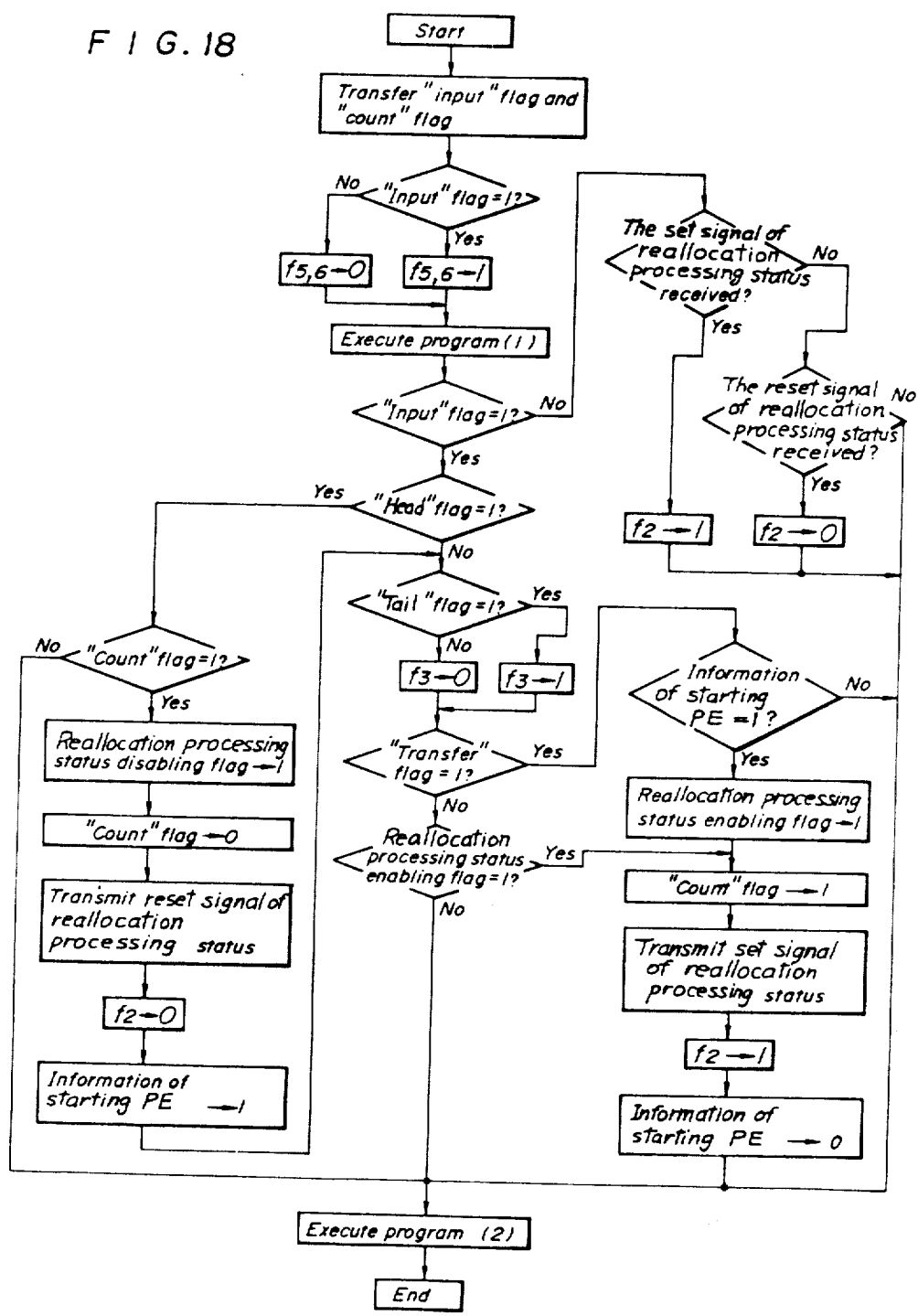

ARRAY PROCESSOR AND CONTROL METHOD THEREOF

BACKGROUND OF THE INVENTION

This is a continuation of application Ser. No. 705,376 filed Feb. 25, 1985, which was abandoned upon the filing hereof.

1. Field of the Invention

The present invention relates to an array processor for executing computations for all combinations of two types of variables and for recursive formulas with local dependency of data using these computation results, which are characterized by matching computations based on dynamic time warping or dynamic programming theory used in case of pattern matching in speech recognition and character recognition, and a control method of the array processor.

2. Prior Art of the Invention

Dynamic time warping is known as an effective technique in pattern matching in speech recognition or character recognition. The dynamic time warping requires real-time processing of an enormous volume of data, so that high speed processing is necessary. Processing of the dynamic time warping is one type of computation, which consists of computation of all combinations of two types of variables and that of recursive formulas with local dependency of data using the results of such computation.

As an illustration, an example of a matching computation based on dynamic time warping, which includes the computation between two types of vector variables and that of recursive formulas of cumulative operations using such computation results, will be shown.

$$\begin{cases} D_{ij} = |c_i - r_j|^2 = \sum_{k=1}^{m} |c_k{}^i - r_k{}^j|^2 & (1) \\ S_{ij} = D_{ij} + \min \begin{pmatrix} S_{i,j-1} \\ S_{i-1,j-1} \\ S_{i-1,j} \end{pmatrix} & (2) \\ S_{0j} = \infty, S_{i0} = \infty, S_{00} = 0 & (3) \end{cases}$$

where:

$c_i$ and $r_j$ are ith and jth elements, respectively, of a vector $C=(c_1, c_2, \ldots, c_I)$ with I elements and a vector $R=(r_1, r_2, \ldots, r_N)$ with N elements. Furthermore, m expresses an order of each vector. $c_i$ represents ($c_1{}^i, c_2{}^i, \ldots, c_m{}^i$) and $r_j$ represents ($r_1{}^j, r_2{}^j, \ldots, r_m{}^j$). $D_{ij}$ and $S_{ij}$ express a distance between vectors and a cumulative distance, respectively.

As an array processor which can process this type of computation in parallel, there is known a conventional arrangement in which, when the numbers of data in two types of vectors are I and N, respectively, (I×N) processing elements (hereinafter referred to as PE) are disposed in an orthogonal network.

Such an orthogonal arrangement of an array processor is disclosed in U.S. Pat. No. 4,384,273 for Ackland et al., "An Integrated Multiprocessing Array for Time Warp Pattern Matching" by Bryan Ackland et al., English International Symposium on Computer Architecture, Minneapolis, Minn., PP197-215 (May 12-14, 1981), "A systolic processing element for speech recognition" by N. H. E. Weste et al., ISSCC 82, PP274-275 (1982) and "A High Speed Array Computer for Dynamic Time Warping" by D. J. Burr et al., IEEE Conference on Acoustics Speech and Signal Processing, PP471-474 (March, 1980).

FIG. 1 shows an illustrative arrangement of an array processor arranged in an orthogonal network. FIGS. 2A and 2B; 3A and 3B; 4A and 4B; and 5A and 5B show an example of the operations of the array processor. In FIG. 1, reference numeral 100 denotes a PE, reference numeral 200 a local data path, and reference numeral 300, an instruction bus. Reference numeral 400 denotes an input terminal, and reference numeral 500 an output terminal.

Each PE 100 has a means for executing an intervector distance computing equation (1) that consists of addition and multiplication computations and a comparison and cumulative computing equation (2), and a means for receiving and transferring the results of the comparison computations from the adjacent PEs and the results of cumulative computations $S_{ij}$, and the vector data $c_i$ and $r_j$. Further, each PE is denoted with a number indicating its position in the orthogonal arrangement. When the PE at the intersection point of the column i and the row j is described as $PE_{ij}$, the above-mentioned equations (1), (2) and (3) can be executed with the following operations.

(i) From the leftward adjacent $PE_{i-1,j}$ which is adjacent to $PE_{i,j}$ on the left side and the downward adjacent $PE_{i,j-1}$ which is adjacent to $PE_{i,j}$ downward (alternatively from a left-edge input terminal and a bottom-edge input terminal) two types of vector data $c_i$, $r_j$, are inputted and the distance between those vectors is obtained by executing equation (1).

(ii) Vector data $c_i$ and $r_j$ are transferred respectively to the rightward adjacent $PE_{i+1,j}$ and the upward adjacent $PE_{i,j+1}$.

(iii) From the leftward adjacent $PE_{i-1,j}$ a cumulative computation result $S_{i-1,j}$ is inputted and from the downward adjacent $PE_{i,j-1}$ a comparison computation result of min ($S_{i,j-1}$ and $S_{i-1,j-1}$) is inputted, and a comparison computation min $\{S_{i-1,j}, \min(s_{i,j-1}, S_{i-1,j-1})\}$ is executed, and $D_{ij}$ obtained in step (i) is added to the result of this computation to obtain $S_{ij}$.

(iv) A comparison computation min ($S_{ij}, S_{i-1,j}$) is executed, and the result of this computation is transferred to the upward adjacent $PE_{i,j+1}$ and a cumulative computation result $S_{i,j}$ is transferred to the rightward adjacent $PE_{i+1,j}$.

Steps (iii) and (iv) illustrate the process for executing the comparison and cumulative computing equation (2). That is, of the three types of cumulative results $S_{i,j-1}$, $S_{i-1,j}$, $S_{i-1,j-1}$ needed for executing the cumulative computing equation (2) in $PE_{ij}$, $S_{i,j-1}$ and $S_{i-1,j}$ exist respectively in $PE_{i,j-1}$ which is rightward adjacent to $PE_{ij}$ and in the leftward adjacent $PE_{i-1,j}$, while $S_{i-1,j-1}$ exists in a $PE_{i-1,j-1}$ which is diagonally adjacent to $PE_{ij}$.

For this reason, the above-mentioned two data require a single transfer, and the latter requires two transfers via $PE_{i,j-1}$. However, if in the $PE_{i,j-1}$ through which $S_{i-1,j-1}$ is transferred, $S_{i,j-1}$ and $S_{i-1,j-1}$ are compared in advance and the result of that comparison is transferred to $PE_{ij}$ so that a comparison computation can be executed on this data and the data $S_{i-1,j}$ transferred from $PE_{i-1,j}$, the result is equal to the execution of a comparison computation of the three data according to equation (2) in $PE_{ij}$.

These operations make it possible to obtain a final cumulative result $S_{I,N}$ while calculating the distance $D_{i,j}$ between vectors and the cumulative result $S_{i,j}$ by a method of executing the operations in steps (i)–(iv) for all PEs on the diagonals shown by solid lines in FIG. 1 as the contents of processing in all PEs, or a method of executing the two types of operations in (i) and (iii), and in (ii) and (iv) as the contents of parallel processing by turns on adjacent diagonals.

In the case of the latter execution method, the number of effective dynamic steps differs from the two parallel processing units, so that the number of execution steps must be adjusted with a NOP instruction (no operation instruction). A detailed explanation of this matter will be omitted here.

FIGS. 2A and 2B; 3A and 3B; 4A and 4B; and 5A and 5B show the operations in the orthogonal array in the case of this latter execution method over a period from time t to time t+3. Here, time is measured in units of the time required by each PE to execute all the processing in steps (i) and (iii), and (ii) and (iv). FIGS. 2A, 3A, 4A and 5A, and 2B, 3B, 4B, and 5B show respectively the conditions when the data enclosed in rectangles is computed during the above unit times in each PE.

In such an orthogonal array, the localism and uniformity of the computations are utilized to permit parallel processing. But, for instance, when the above dynamic time warping equation (2) is a complicated computing equation such as that shown in (4), the transfer of cumulative results $S_{i-1,j-1}$, $S_{i-1,j-2}$, $S_{i-2,j-1}$ of equation (4), and the acceptance of the three data that are the subjects of the comparison computations must be executed through two PEs.

The methods involved may execute the comparison computation in $PE_{ij}$ after these three data have been inputted into $PE_{ij}$. Thus, the contents of the processing in each PE which should be executed in parallel become complicated, and in addition it is not possible to execute parallel processing in which the PEs are used with a sufficient efficiency.

$$S_{ij} = D_{ij} + \min \begin{pmatrix} S_{i-2,j-1} + 2D_{i-1,j} \\ S_{i-1,j-1} + D_{ij} \\ S_{i-1,j-2} + 2D_{i,j-1} \end{pmatrix} \quad (4)$$

Furthermore, in the dynamic time warping computation under consideration, the number of PEs must be determined in accordance with both positive integers N and I that express the number of data in the two types of vector series for processing, so that in order to execute the dynamic time warping computations of the multiple vector series $C_u$ ($C_u = \{c_1^u, c_2^u, \ldots, c_{I_u}^u\}$; u=1, 2, ..., $I_c$) and the multiple vector series $R_v$ ($R_v = \{r_1^v, r_2^v, \ldots, r_{N_v}^v\}$; v=1, 2, ..., $I_r$), the values Nmax=

$$\left( \max_{1 \leq v \leq I_r} N_v \right) \text{ and } I\max = \left( \max_{1 \leq u \leq I_c} I_u \right)$$

must be chosen for the positive integers N and I, and the number of necessary PEs is (Nmax × Imax).

Consequently, when performing the processing for vector series $C_u$ and $R_v$, a multiplicity of PEs will exist which are unnecessary to the execution of the operations for the dynamic time warping computation processing with respect to all combinations of vector series except the combination of Cmax and Rmax. As a result, effective use of the hardware is not achieved.

Moreover, the need to determine the number of necessary PEs according to the maximum number of data which are to be processed constitutes a large obstacle to reduction in the system scale by using LSI techniques. The number of PEs which can be accommodated in a single LSI chip varies according to the functions of the PEs. For instance, when about four PEs are mounted in a single LSI chip and Nmax=60 and Imax=60, 900 LSI chips must be arranged and connected in orthogonal network.

In order to control this type of conventional array processor, each processing element (PE) executes simultaneous processing in accordance with instructions given by a host computer.

In the arrangement described above, when processing is being executed for a certain vector series $R_v$ that satisfies the condition $N_v <$ Nmax (v=1, 2, ..., $I_r$), a final result will arise simultaneously from each processing element of $PE_{i,N_v}$ (a number is given to each PE, and the PE at the intersection of a column i and row j). However, since each of these PEs is on one certain diagonal, the processing which is executed in accordance with equation (1) by the PEs except the PE just mentioned that is on the same diagonal is the same as that executed by this PE on the same diagonal, and no distinction can be made between the contents of processing in those of PEs on diagonals. Therefore, the final result for this vector series $R_v$ must be also outputted from each processing element $PE_{i,Nmax}$, and the PEs from column ($N_v + 1$) to column Nmax must play the role of transferring these processing results as they are. This type of control is required for each vector series $R_v$. Since the distribution of PEs which transfer the processing results as they are to each vector series varies, suitable control must be executed while the host computer controls the processing conditions of each PE. In this method, all of (I×Nmax) PEs are controlled, the exchange of control signals between each PE and the host computer, and the input of instructions to each PE becomes extremely complicated.

SUMMARY OF THE INVENTION

In view of the above matters, it is an object of the present invention to provide an array processor which attains high-efficiency parallel processing of computation of all combinations of two types of variables and of computation of recursive formula equations with local dependency using these computation results, which is typical of dynamic time warping computation, in an array arrangement consisting of a number of processing elements (PE) corresponding to a volume of computation being performed, while each PE is operating effectively.

It is a further object of the present invention to provide an array processor control method in which each PE forming the array processor contains built-in instructions, and in which each PE determines its own conditions within the overall processing of the array to starts corresponding instructions, so that the autonomous control is performed in the array.

In order to attain these objects, I and N as well as n are positive integers. The relation between N and n is in fact regulated within the range defined by In the first aspect of the present invention, an array processor comprises multiplexers, n processing elements connected through the multiplexers in the form of a ring, and means for controlling the multiplexers and the processing elements. Each of the processing elements includes means for inputting one of input vector data $c_i$ and $r_j$ of two types of input vector data series $C=\{c_i\}$ (i=1, 2, ..., I) and $R=\{r_j\}$ (j=1, 2, ..., N), means for inputting the other input vector data from an I/O data bus, means for performing predetermined computations of addition and subtraction, comparison computations and product-sum computations between the two types of input vector data and for storing the results of the computations, means for transmitting one of the input vector data and a computation result from the computation means to an adjacent processing element, means for outputting a final computation result from the computation means to the I/O bus, means for executing processing in which all of the processing elements transfer the respective processing results to adjacent processing elements simultaneously $$\frac{(\bmod N)}{n}$$

times (where $$\frac{\bmod N}{n}$$

expresses a remainder when N is divided by n) in parallel with a computation processing in each processing element, and means for controlling the computation means and the execution means. Each of the multiplexers includes means for selecting one of a data transfer path for performing data exchange between the adjacent processing elements and an input vector data bus for providing one of the input vector data from an external source.

Here, the input means for inputting one of the vector data may include a first terminal to be coupled to a data transfer path, a first register connected to the first terminal, and a first buffer memory connected to the first register. The input means for inputting the other input vector data may include an I/O terminal, a second register connected to the I/O terminal and a second buffer memory connected to the second register. The computation means may include a first computation unit for executing addition and subtraction and comparison computation, a second computation unit for executing product-sum computation, a buffer register for the first computation unit, a first selector for selecting one of an output from the buffer register, an output from the first register and an output from the second computation unit, a work memory for storing an output from the first selector, and a second selector for selecting one of an output from the first register, an output from the buffer register, an output from the first buffer memory, an output from the second buffer memory and/or an output from the work memory and for supplying the selected output to the first computation unit. The execution means may include a counter, a third selector for selecting one of a first address information from the counter and a second address information from the control means, and a portion of the work memory connected to the third selector. The transmitting means may include a third register connected to the work memory, and a second terminal connected to the third register and to be coupled to the data transfer path. The output means to the I/O bus may include a fourth register connected to the work memory, and the I/O terminal. The control means may receive a control signal from the means for controlling the processing elements and the multiplexers.

The processing element may further include means for receiving a status flag from one of adjacent processing elements to transmit the status flag to one of the other adjacent processing elements. The second register may include a register portion for storing a flag added to the input vector data inputted from the I/O bus. The control means may include a processing element control unit which receives the control signal from an external source, a fag signal from the register portion and the status flag to form an instruction control signal, and a processing instruction unit which receives the instruction control signal to form the second address information and control signals for controlling the first, second and third selectors.

In the second aspect of the present invention, there is provided a control method of an array processor which receives a first vector data series $C=\{c_i\}$ (i=1, 2, ... I) consisting of I first input vector data and a second vector data series $R=\{r_j\}$ (j=1, 2, ..., N) consisting of N second input vector data, and outputs a result of a predetermined computation. The control method comprises the steps of:

using an array processor having n processing elements which are connected in the form of a ring and into which the first input vector data and the second input vector data are inputted;

dividing the first input vector data into P groups (P is an integer equal to or larger than 1) by every partial input vector data;

executing a predetermined processing between the n partial input vector data of each group and the second input vector data; and repeating sequentially the predetermined processing between each of the P groups and the second vector data series to produce a final processing result from the processing elements. The predetermined processing comprises the steps of:

inputting the n first input vector data into each of the processing elements;

transferring circularly the n first input vector data successively between the respective processing elements and inputting each one of the partial input vector data of each group into each one of the processing elements, or inputting each one of the second input vector data into each one of the processing elements in the sequence of the processing elements at every time that the partial input vector data is transferred circularly among the processing elements or inputted into the processing elements;

processing the partial input vector data, the second input vector data and a processing result transferred from an adjacent processing element and transferring a new processing result to an adjacent processing element;

repeating the processing and transferring step; and transferring a new processing result in one processing time $$\frac{(\text{mod} N)}{n}$$

times among the processing elements in case that a processing result in one group is used in the processing in the following group.

Here, the control method of an array processor may further comprise the steps of:

containing processing instructions in the processing elements;

adding to the second input vector data a flag indicating a processing status that is generated in each of the processing elements in a predetermined sequence;

providing a status flag showing individual processing status to each of the processing elements;

transferring the status flag between the processing elements;

judging the status flag so that the first and second input vector data are inputted into the processing element;

judging the flag added to the inputted second input vector data to change the content of the status flag in the processing element; and providing a status produced by the change to the processing elements; thereby performing autonomous control in the overall array processor in such a manner that the processing element starts processing instructions corresponding to the status.

The above and other objects, effects, features and advantages of the present invention will become more apparent from the following description of preferred embodiments thereof taken in conjunction with the accompanying drawings.

BRIEF DESCRIPTION OF THE DRAWINGS

FIG. 12 is an explanatory diagram showing an example of a flag added to input vector data;

FIG. 18 is a flow chart showing an example of a control flow of the control unit in each processing element.

DETAILED DESCRIPTION OF THE PREFERRED EMBODIMENTS

Figure 1:
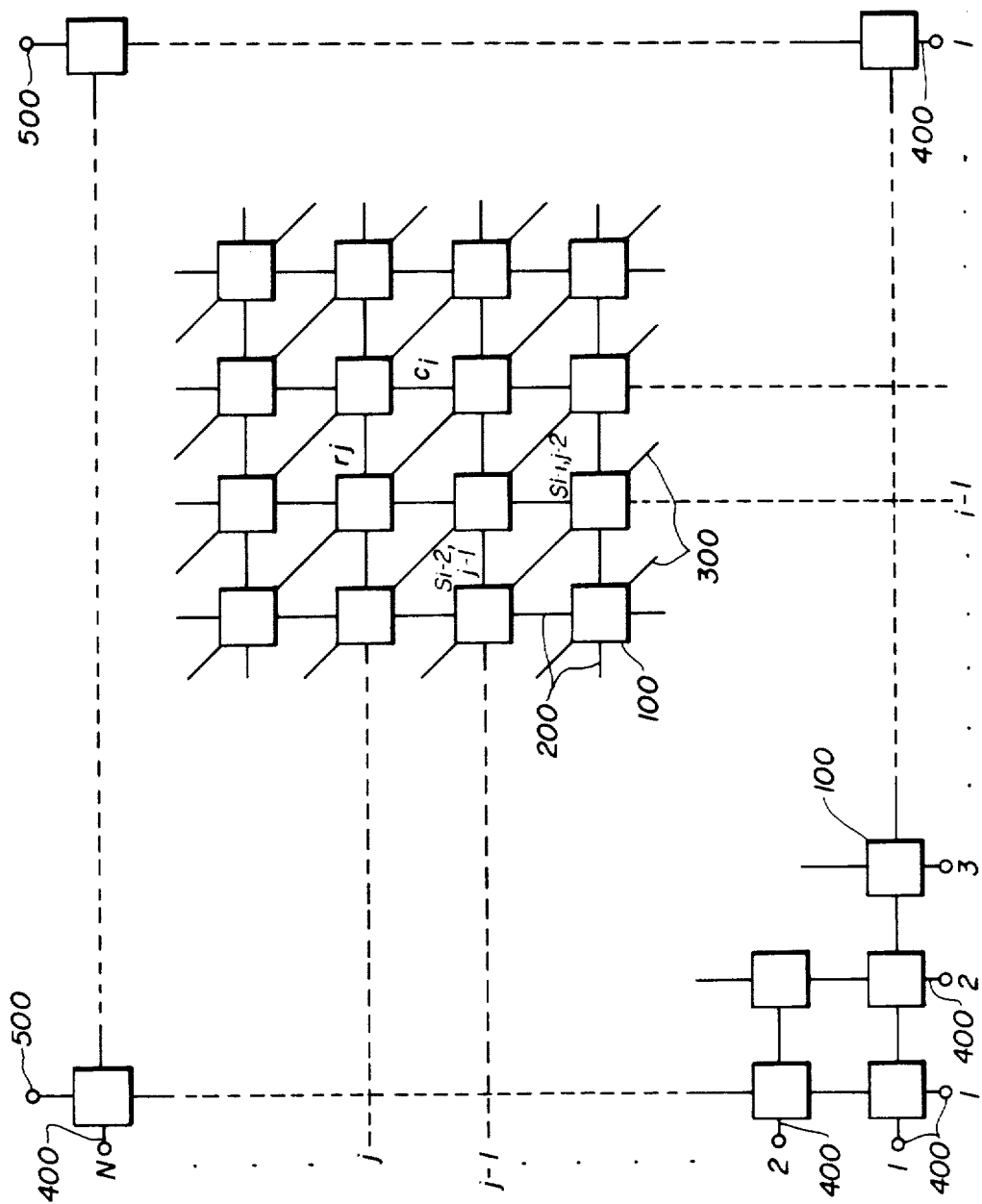
FIG. 1 is a diagram showing an example of an arrangement of a conventional orthogonal array processor.
Figure 3A:
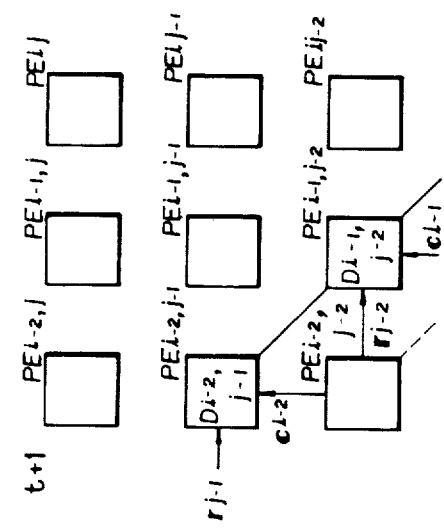
Figure 3B:
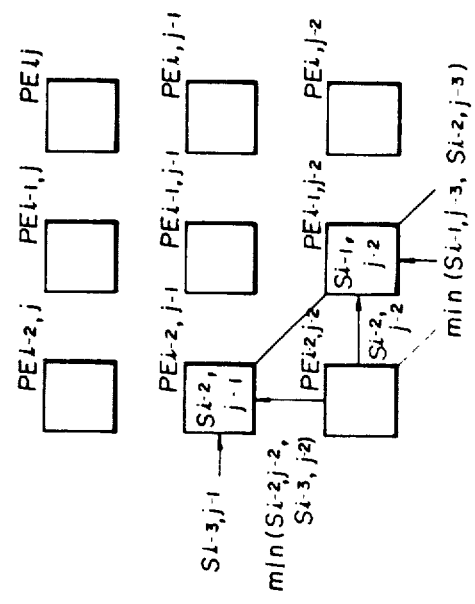
Figure 2A:
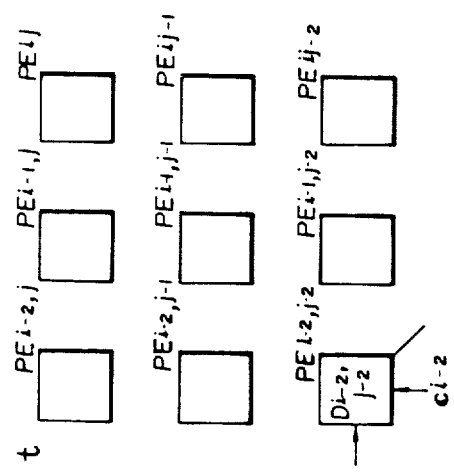
FIGS. 2A and 2B; 3A and 3B; 4A and 4B; and 5A and 5B are explanatory diagrams illustrative of an example of processing operations of the array processor.
Figure 2B:
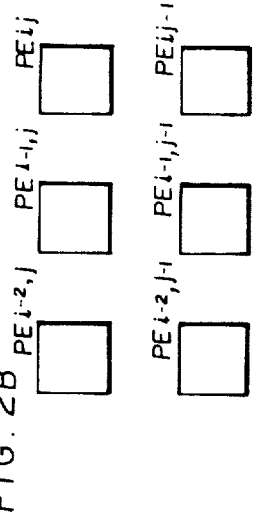
Figure 6:
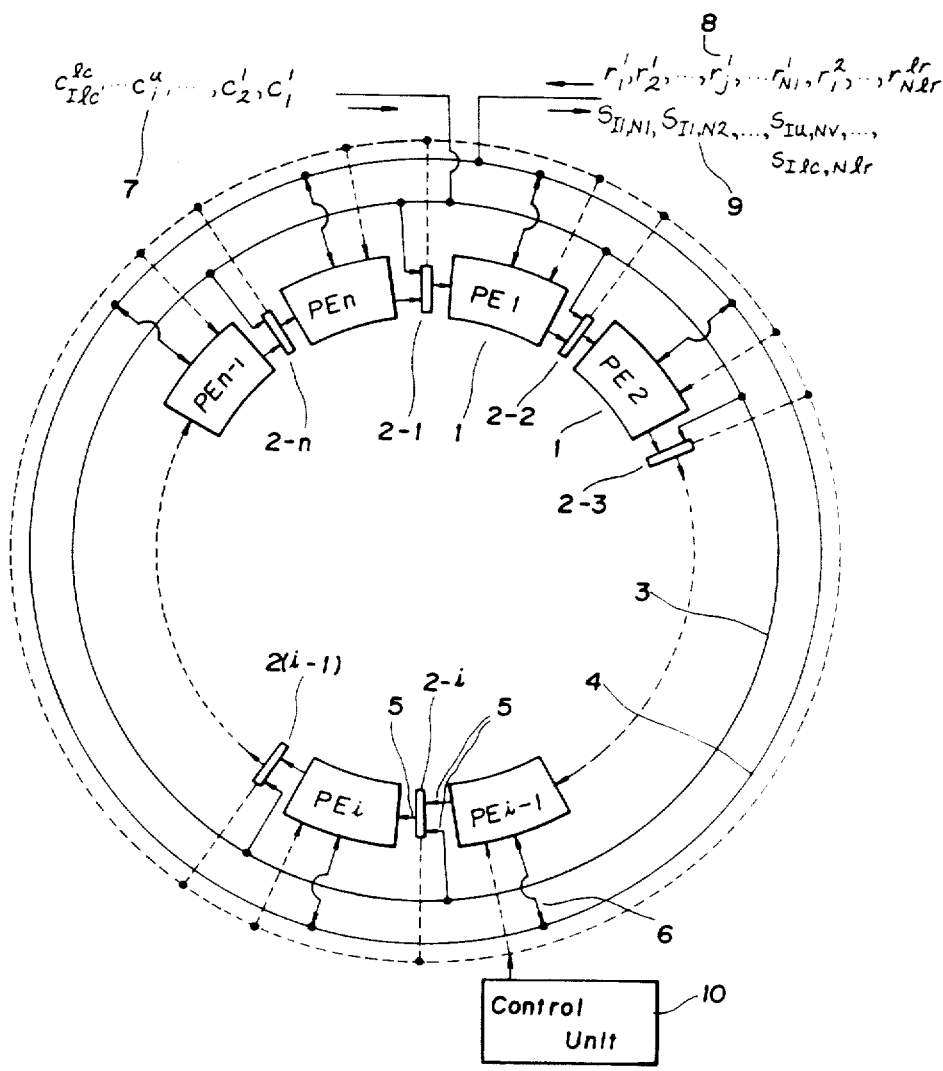
FIG. 6 is a block diagram showing an embodiment of an array processor in accordance with the present invention.

FIG. 6 shows an embodiment of an array processor in accordance with the present invention when the above-mentioned equations (1), (2) and (3), as an example of a matching computation based upon dynamic time warping, are executed for two types of vector series $C_u$ and $R_v$ ($u=1, 2, \ldots, l_c$, $v=1, 2, \ldots, l_r$).

In FIG. 6 it is assumed that the number of PEs is n. Reference numeral 1 denotes the single PE which contains an arithmetic unit for executing addition and subtraction, comparison computations and multiplication and addition computations in order to execute the dynamic time warping computation equations (1), (2) and (3), and which also have registers for exchanging data with adjacent PEs and for exchanging data with external sources, and a memory for storing computation results and transferred data. These PEs 1 are disposed in the form of a ring.

Reference numerals 2-1 to 2-n are multiplexers controlled by a control unit 10 described below to select one of two situations. That is, in one situation, n (the number of PEs) input vector data from external sources $c_i^u$ ($i=1, 2, \ldots, l_u$) is inputted into the array at a time, and in another situation input vector data $c_i^u$ ($i=1, 2, \ldots, l_u$) is transferred circularly from the adjacent PE. For example, when n input vector data series $c_1^u, c_2^u, \ldots, c_n^u$ are inputted into each PE in the array from $PE_1$, only the multiplexer 2-1 selects an input vector data bus 3 from an external source (not shown), and this is used as an input port for input vector data series $c_1^u, c_2^u, \ldots, c_n^u$ from the external source. Starting from $PE_1$ as an origin point, each of the n input vector data $c_1^u, c_2^u, \ldots, c_n^u$ is assigned to each PE by transferring the input vector data $c_i^u$ successively to the adjacent PEs. In other cases, all multiplexers 2-1 to 2-n select a data transfer path 5 between PEs which transfers input vector data series $c_1^u, c_2^u, \ldots, c_n^u$ circularly between PEs. Each PE is so arranged that each processing result is transferred $$\frac{\bmod N}{n}$$

times simultaneously to the adjacent PE in parallel with a usual parallel processing in all PEs at every time that the above-described n input vector data patterns are exchanged as described below. Here, $$\frac{\bmod N}{n}$$

expresses the remainder when N is divided by n.

Reference numeral 4 denotes an I/O bus for inputting successively vector data of other input vector data series $R_\nu = \{r_1{}^\nu, r_2{}^\nu, \ldots, r_{N\nu}{}^\nu\}$ ($k=1, 2, \ldots, l_r$) into each PE, additionally as outputting final results of computations $S_{I1,N1}, S_{I1,N2}, \ldots, S_{Iu,Nv}, \ldots, S_{Ilc,Nlr}$. Reference numeral 5 denotes a data transfer path for executing circular transfer of input vector data $c_i{}^\mu$ between PEs and for executing transfer of a cumulative computation results $S_{ij}$. Reference numeral 6 denotes an I/O terminal of each PE connected to an I/O bus. Further, reference numerals 7, 8 and 9 denote input vector data $c_i{}^\mu$ and $r_j{}^\nu$ ($i=1, 2, \ldots, I_u; j=1, 2, \ldots, N_v; u=1, 2, \ldots, l_c; v=1, 2, \ldots, l_r$), and final computation results $S_{I1, N1}, S_{I1, N2}, \ldots, S_{Iu, Nv}, \ldots, S_{Ilc, Nlr}$. Reference numeral 10 denotes a control unit for performing control operations of the overall system, including the determination of timing of exchange of the above-mentioned input vector data and counting of the number of transfers of the processing results.

Figure 7:
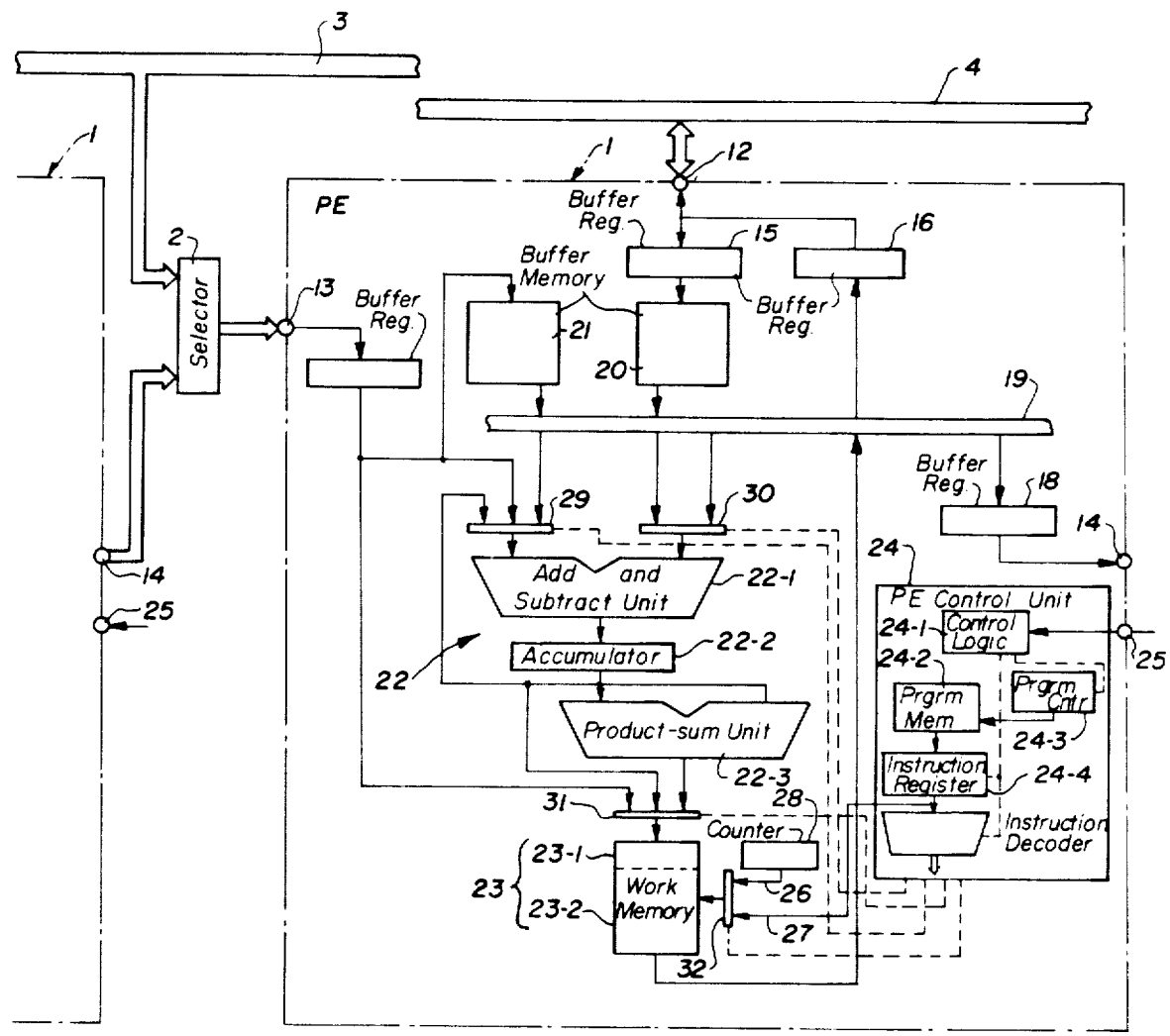
FIG. 7 is a block diagram showing an embodiment of the processing element in the array processor of the present invention.

FIG. 7 shows an embodiment of an arrangement of each PE. The portion surrounded by a dash-and-dotted line 1 indicates a single PE 1. Reference numeral 4 denotes an external I/O bus for input vector data $r_j{}^\nu$ ($j=1, 2, \ldots, N_\nu$) to each PE and for outputting final computation results $S_{Iu, Nv}$. Reference numeral 12 denotes an I/O terminal for receiving/transferring data from/to an external I/O bus 4. Reference numeral 13 denotes a terminal for data transfer from a leftward adjacent PE, while reference numeral 14 denotes a terminal for data transfer to a rightward adjacent PE.

Reference numeral 15 denotes a buffer register for storing an input of vector data $r_j$ from the external I/O bus 4. Reference numeral 16 denotes a buffer register for storing and outputting final computation results $S_{Iu, Nv}$ to the external I/O bus 4. Reference numeral 17 denotes a register for storing an input of vector data $c_i{}^\mu$ ($i=1, 2, \ldots, I_u$) from an adjacent PE and an input of data needed in calculation of a cumulative computation $S_{ij}$ executed in processing operations (b) and (c) described below. Reference numeral 18 denotes a register for transferring vector data $c_i{}^\mu$ ($i=1, 2, \ldots, I_u$) to an adjacent PE and for performing the transfer of data to be required to calculate the cumulative computation $S_{ij}$. Reference numeral 19 denotes an internal bus.

Reference numerals 20 and 21 denote, respectively, buffer memories that store all components $r_k{}^{vj}, c_k{}^{ui}$ ($k=1, 2, \ldots, m$) of vector data $r_j{}^\nu$ and $c_i{}^\mu$ to be inputted into the respective PEs. Reference numeral 22-1 denotes an add and subtract unit having addition and subtraction functions and reference numeral 22-2 denotes an accumulator for accumulating the result from the add and subtract unit 22-1. Reference numeral 22-3 denotes a product-sum unit having product-sum computation functions. An arithmetic unit 22 formed by the unit 22-1 and 22-3 and the accumulator 22-2 executes the computations expressed by equations (1) and (2). The add and subtract unit 22-1 can be 54F385 or 74F385 manufactured by Fairchild, Inc. The product-sum unit 22-3 can be ADSP-1010 manufactured by Analog Devices, Inc. Reference numeral 23 denotes a work memory for storing data to be required for executing equations (2) and (3). This work memory 23 has two areas 23-1 and 23-2 according to the status of the stored data. That is, the area 23-1 stores the data required for the execution of processing operations (a), (b) and (c) during circular transfer of input vector data $c_i{}^\mu$ described hereinafter, and the area 23-2 stores the data required for executing processing operations (b) and (c) directly following the exchange of n vector series among vector series $C_1, C_2, \ldots, C_{lc}$.

Reference numeral 24 denotes a PE control unit that performs control according to an internal microprogram or instructions from an external source. The PE control unit 24 has a control logic 24-1, a program memory 24-2 for storing the internal microprogram, a program counter 24-3 for controlling the memory 24-2, an instruction register 24-4 for storing data read out from the memory 24-2 and an instruction decoder 24-5 for decoding the data stored in the instruction register 24-4. The control logic 24-1 receives control signals from the control unit 10 shown in FIG. 6 via an input terminal 25 to control the portions 24-2–24-5.

Reference numerals 26 and 27 denote address lines to the work memory 23. The address line 26 receives the output from a counter 28 which accesses the area 23-2 that stores intermediate computation results. The address line 27 corresponds, for instance, to a direct address from the microprogram supplied from the instruction register 24-4, and accesses the storage area 23-1 for storing data required for the individual processing in the above processing operations (b) and (c).

Reference numerals 29, 30, 31 and 32 denote selectors which are controlled by the PE control unit 24.

As explained above, the computation result produced in the arithmetic unit 22 is stored in the work memory 23. The registers 17 and 18 are provided for transferring data between adjacent PEs, in such a manner that while the above-mentioned computation result is stored in the register 18 from the work memory 23 and then the result is being transferred from that register 18 to the register 17 of the adjacent PE, the next computation is performed in the arithmetic unit 22. Consequently, in parallel with the regular processing unit for transferring the input vector data $c_i$ that is defined by paragraphs (a), (b) and (c) described below to compute $D_{ij}$ and $S_{ij}$ and for transferring the result of the computation, it is possible to transfer the processing results $$\frac{\bmod N}{n}$$

times as described below to the adjacent PEs simultaneously, using the interval during which each PE is executing the above-described computations, without disturbing the regular processing flow at all, when changing the input vector data pattern.

Table 1 shows an embodiment of a program memory.

TABLE 1

| | Data-Transfer | | | | | Arithmetic Operation | |
|---|---|---|---|---|---|---|---|
| 1 | M21 → R18 | T13 → R17 | R17 → M21 | R17 → U22-1 | T12 , R15 | R15 → M20 | M20 → U22-1 | |
| | M21 → R18 | T13 → R17 | R17 → M21 | R17 → U22-1 | T12 → R15 | R15 → M20 | M20 → U22-1 | $(c_1{}^i - r_1{}^j) \to$ U22-2 |
| | M21 , R18 | T13 → R17 | R17 → M21 | R17 → U22-1 | T12 → R15 | R15 → M20 | M20 → U22-1 | $(c_2{}^i - r_2{}^j) \to$ U22-2 |
| | M21 → R18 | T13 → R17 | | | T12 → R15 | R15 → M20 | | |
| | M21 → R18 | T13 → R17 | | | T12 → R15 | R15 → M20 | | $\sum_{k=1}^{2}(c_k{}^i - r_k{}^j)^2$ |
| | . . . | . . . | . . . | . . . | . . . | . . . | . . . | . . . |
| | M21 → R18 | T13 → R17 | R17 → M21 | R17 → U22-1 | T12 → R15 | R15 → M20 | M20 → U22-1 | $(c^j{}_{m-1}, r^j{}_{m-1}) \to$ U22-2 |
| | | T13 → R17 | R17 → M21 | R17 → U22-1 | | R15 → M20 | M20 → U22-1 | $(c^i{}_m, r^j{}_m) \to$ U22-2 |
| | | | R17 → M21 | R17 → U22-1 | | | M20 → U22-1 | $\sum_{k=1}^{m-1}(c_k{}^i - r_k{}^j)^2$ |
| 2 | $\sum_{k=1}^{m}(c_k{}^i - r_k{}^j)^2 \to$ M23 — 1 | | | | | | | $\sum_{k=1}^{m}(c_k{}^i - r_k{}^j)^2$ |
| 3 | M23-1 , R18 | | | | | | | |
| 4 | T13 → R17 | | | | | | | |
| 5 | R17 → U22-1 | | | | | | | |
| 6 | M23-2 → U22-1 | | | | | | | |
| 7 | M23-1 , U22-1 | | | | | | | |
| 8 | A → U22-1 | | | | | M23-2 → R18 | | MINIMUM → A |
| 9 | M23-2 → U22-1 | | | | | T13 → R17 | | ADD → A |
| 10 | A → U22-1 | | | | | R17 → M23-2 | | |
| 11 | A , M23-2 | | | | | | | MINIMUM → A |
| 12 | A → M23-1 | | | | | M23-2 → R16 | | |
| 13 | | | | | | R16 → T12 | | |

M = Memory
T = Terminal
R = Register
U = Unit
A = Accumulator

Items (1) and (2) denote contents of the programs for vector distance computations and for cumulative distance computations, respectively. Item (1) shows the manner in which vector distance computations are performed in parallel, while the respective components of vector data $c_i$ and $r_i$ are inputted simultaneously. An explanation will be made of the program contents of the cumulative distance computations in item (2). The instructions in the first and fourth fields of item (2) correspond to cumulative distance computations for each grid point. The second field corresponds to the reallocation processing of the cumulative results. The third field corresponds to the processing for outputting the final cumulative result to an external destination.

A detailed explanation will be made by collating the sequence of instructions in the first and fourth fields to the processing operations (a), (b) and (c). ① means loading of $D_{ij}$, while ② and ③ correspond to the transfer of the comparison computation result of min $(S_{i-2,j}, S_{i-1,j})$ and the input of min $(S_{i-1,j}, S_{i,j-1})$. ④ - ⑥ represent the execution sequence of the comparison computation of min $[S_{i-1,j}, \min(S_{i-1,j-1}, S_{i,j-1})]$. ⑥ - ⑧ represent the sequence for adding $D_{ij}$ to this comparison result to obtain $S_{ij}$. ⑧ - ⑪ correspond to the loading $S_{ij}$ at the same time as obtaining the comparison result of min $(S_{i-1,j}, S_{ij})$ to be transferred to the adjacent PE.

Figure 17:
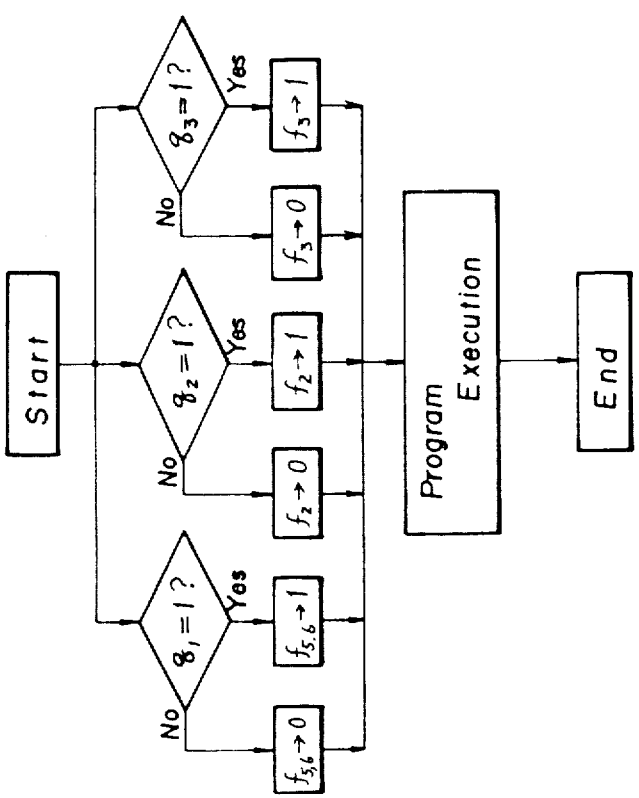
FIG. 17 is a flow chart showing an example of a control flow of a control logic in the control unit of each processing element.

The control logic 24-1 in the PE control unit 24 is so arranged to perform a control flow as illustrated in FIG. 17. In FIG. 17, $q_1$, $q_2$ and $q_3$ represent the names of control signals sent to the respective PEs from an external control unit such as a host computer, and respectively set the input status of vector data $r_j$, the execution status of the reallocation processing and the output status of the final computation result. When each PE receives a program start-up control signal, the control logic 24-1 performs the control of loading the initial address of the program memory 24-2 into the program counter 24-3. Then, the control logic 24-1 receives the control signals $q_1$, $q_2$ and $q_3$ for each status to check these control signals before setting the status flags $f_{5,6}$, $f_2$ and $f_3$. Here, these flags $f_{5,6}$, $f_2$ and $f_3$ are flags activating the 5th and 6th fields, activating the second field and activating the third field of the program sequences (1) and (2), respectively. When these flags are set, the program counter 24-3 is started and programs (1) and (2) are executed. During the execution of these programs, the flags $f_{5,6}$, $f_2$ and $f_3$ are checked, and the control logic 24-1 transmits to the instruction register 24-4 a control signal for masking any fields which are not to be executed. Then, the control logic 24-1 determines the termination of the program and transmits a control signal to the external control unit informing the external control unit of the termination of the processing unit.

The control logic 24-1 repeats this sequence of control operations at every processing time Next, the manner of executing the dynamic time warping computations shown in the above-mentioned computing equations (1), (2) and (3) by the arrangement shown in FIG. 7 will be explained. Matching computation in accordance with the dynamic time warping computation corresponds to the computation of equations (1) and (2) for grid points on two-dimensional grid planes produced by two types of vector data series $C_u$ and $R_v$, respectively.

Figure 8:
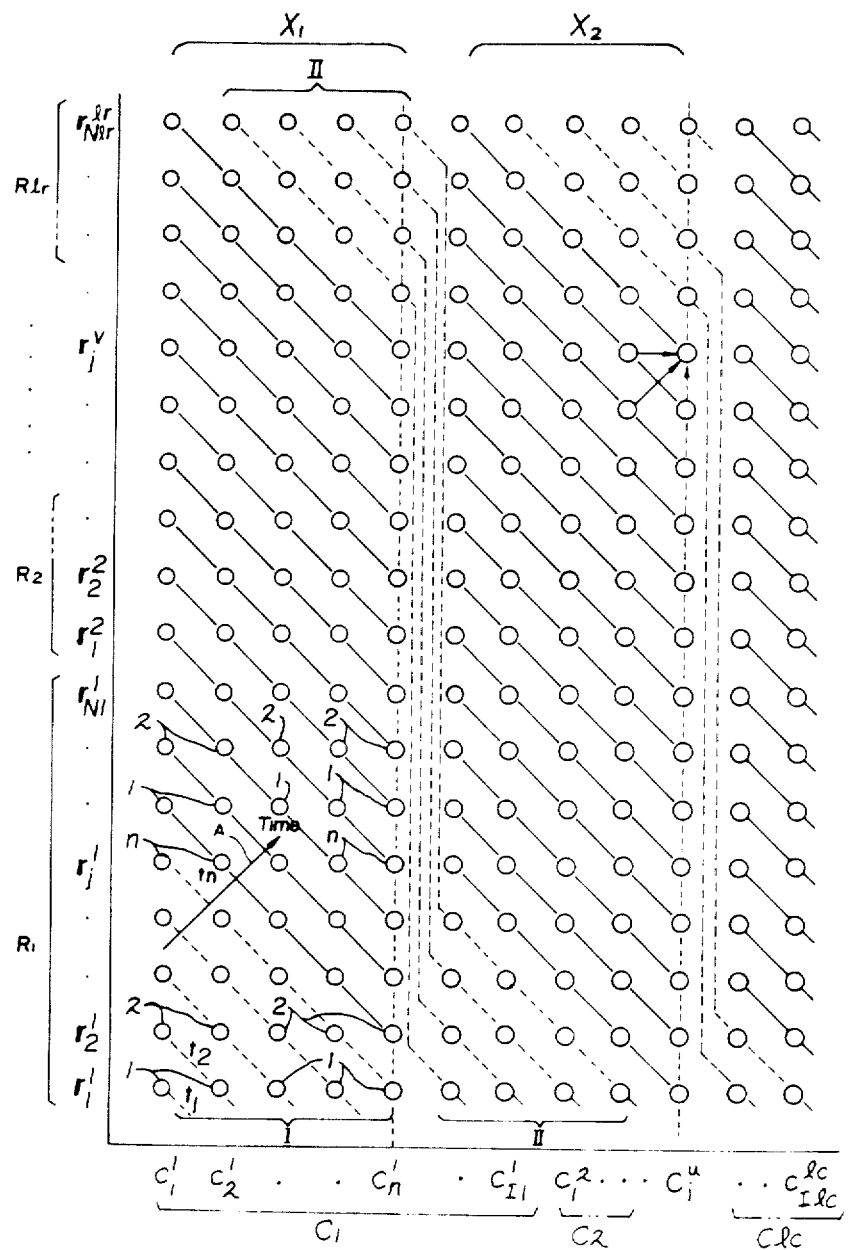
FIG. 8 is an explanatory diagram illustrative of an example of the processing operations in the array processor shown in FIG. 6.

FIG. 8 illustrates a sequence of executions of dynamic time warping computation equations (1) and (2) for the two types of vector data series in this arrangement, that is $1_c$ vector data series $C_u = \{c_1^u, c_2^u, \ldots, c_{l_n}^u\}$ $(u=1, 2, \ldots, l_c)$ and $1_r$ vector data series $R_v = \{r_1^v, r_2^v, \ldots, r_{N_v}^v\}$ $(v=1, 2, \ldots, l_r)$. The sequential executions are expressed in the general graphical illustration of dynamic time warping. In FIG. 8, broken line diagonals and unbroken line diagonals on the grid express an instant in terms of a PE processing as a time unit, and an arrow A indicates the direction of time elapse of instants $t_1, t_2, t_3 \ldots$ In other words, grid points on the same broken or solid line mean that data is being processed simultaneously in the various PEs on the line. Since there are n PEs, the n grid points on the diagonal are always processed at the same time during the execution of the processing. The processing at each processing time moves upwards with the lapse of time in an area indicated by $X_1$, and then continuously moves to the bottom portion of an area $X_2$. Finally, the processing moves toward the upper portion of the area $X_2$. Thus, FIG. 8 shows such a sequential processing in the fashion of the general graphical expression of dynamic time warping. Reference numerals I and II denote groups of broken lines which will be explained hereinafter.

In the example shown in FIG. 8, only n PEs exist physically. That is, in FIG. 8, there exist only the n PEs $PE_1$-$PE_n$ (indicated in the drawing by the encircled numbers 1-n within circles) that are disposed in an oblique direction at the same time position.

Figure 9:
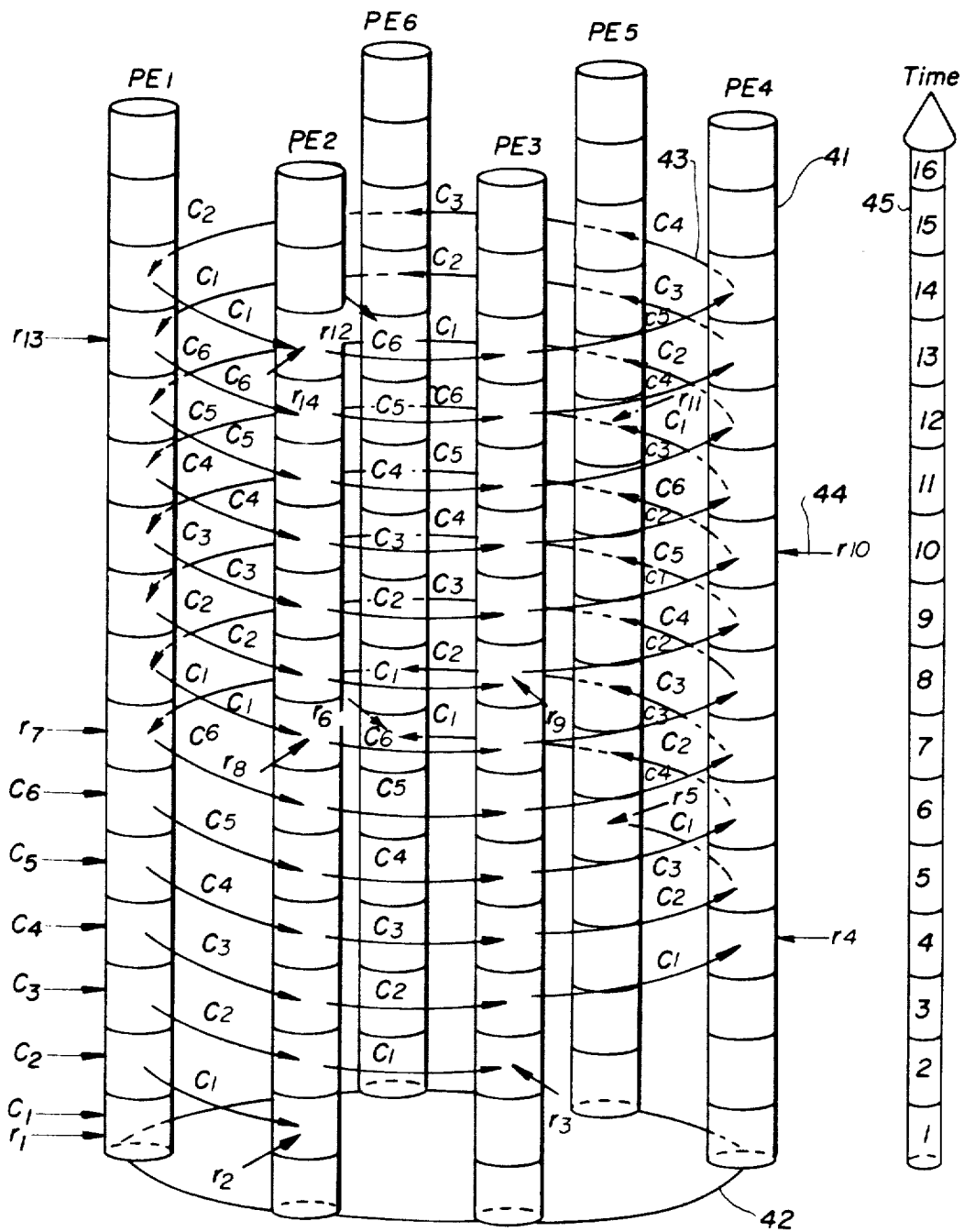
FIG. 9 is an explanatory diagram illustrative of data input from external sources and of conditions of data transfer between processing elements in the array processor shown in FIG. 6.

FIG. 9 shows the manner of data input operations in such an arrangement. In FIG. 9, it is assumed that n=6. Reference numeral 41 denotes a PE and reference numeral 42 denotes a data transfer path for transferring vector data $c_i$ (i=1, 2, ..., I) and cumulative result $S_{ij}$ to an adjacent PE. Reference numeral 43 denotes a flow of vector data $c_i$ (i=1, 2, ..., I) on a data transfer path at every processing time. Reference numeral 44 denotes a vector data $r_j$ (j=1, 2, ..., N) on the I/O bus which must be inputted to each PE at each processing time. Processing time advances along a time column 45 showing the elapse of time. Input vector data series $c_1, c_2, \ldots, c_6$ for the six PEs are inputted successively from $PE_1$. When processing of each vector data at each PE has been completed, that vector data is transferred successively to a rightward adjacent PE. During the time period until the first input vector data $c_1$ returns to the $PE_1$, the data transfer path carrying the input vector data $c_i$ (i=1, 2, ..., 6) increments one by one with the advance of the processing time. After an instant that the input vector data $c_i$ is transferred from $PE_6$ to $PE_1$, the input vector data $c_1$-$c_6$ existing in each PE are transferred simultaneously to an adjacent PE at each processing time. On the other hand, input vector data $r_j$ (j=1, 2, ..., N) is inputted successively to each PE synchronized with the transfer operations for the input vector data $c_i$ (i=1, 2, ..., 6) between each PE. Then, computation of equations (1), (2) and (3) is executed for all the grid points while data are being exchanged regularly between PEs.

The broken lines in group I in FIG. 8 indicate that only the multiplexer 2-1 has been set to select an input vector data bus from an external source, that a number of input vector data series $c_1^1, c_2^1, \ldots, c_n^1$ equivalent to the number of PEs has been inputted sequentially, and that $PE_2$-$PE_n$ exchange vector data $c_x^1$ (x=1, 2, ..., n-1) simultaneously with the adjacent PEs at each time that the processing in each PE is completed. The solid lines in group I that continues on from the broken lines in this group I indicate that after the data $c_1^1$ is inputted to the $PE_n$, all multiplexers 2-1 to 2-n are selected as data transfer paths between PEs, and that computation equations (1), (2) and (3) are executed while input vector data $c_1^1, C_2^1, \ldots, c_n^1$ are transferred circularly from PE to PE. Further, the broken lines in the following group II indicates the process of continuing computation that is performed while the input vector data $c_1^1, C_2^1, \ldots, c_n^1$ are being substituted with the next n vector data series $c_{n+1}^1 \ldots C_{l1}^1, \ldots, c_i^\mu$.

Although two types of vector data $c_i^\mu$ and $r_j^\nu$ are inputted into each PE during each processing time, so that computation equation (1) is executed independently of and in parallel with each PE, computation equation (2) is executed while data are being exchanged with the adjacent PEs.

Figure 10:
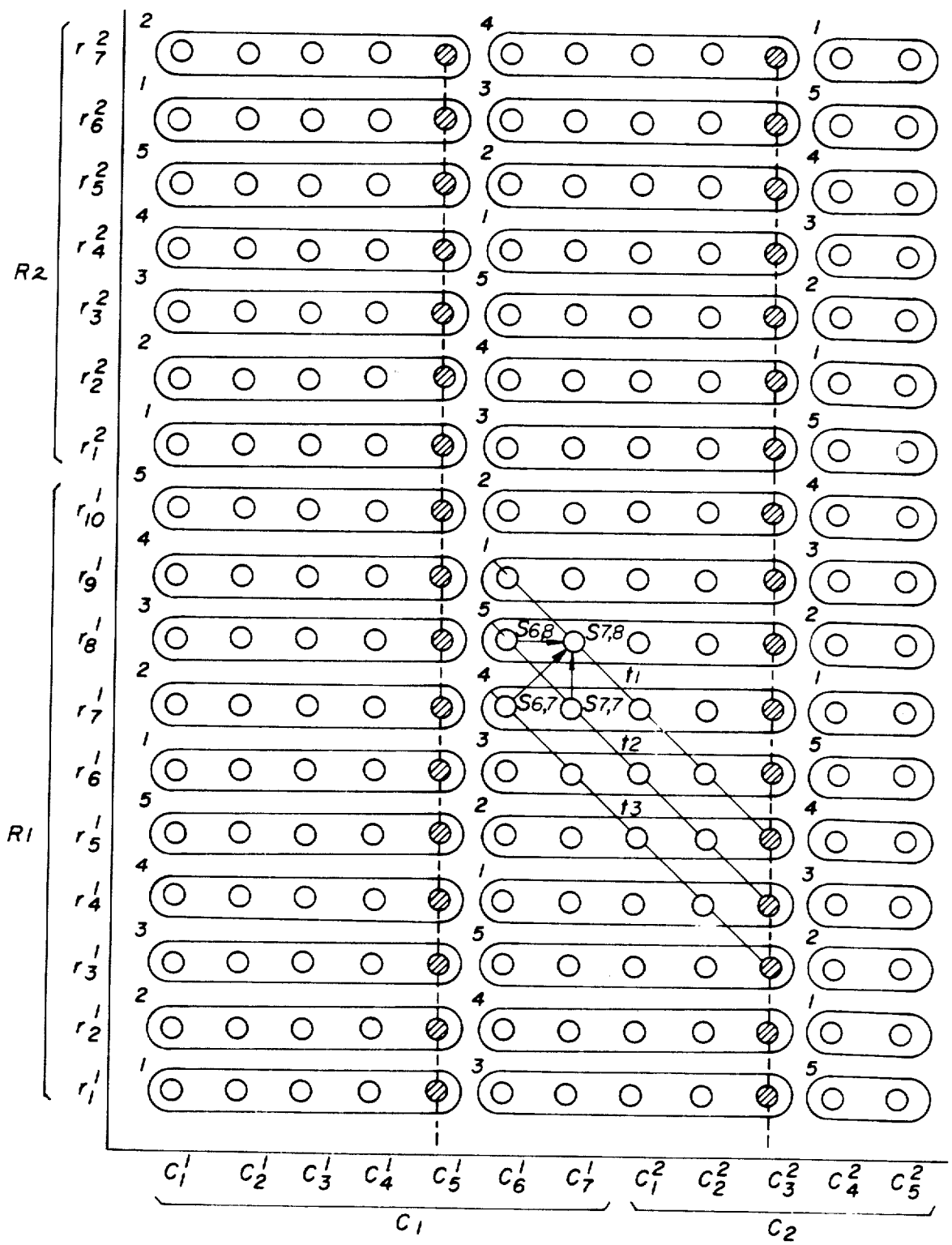
FIG. 10 is an explanatory diagram illustrative of an example of the processing operations of each processing element.

For example, in FIG. 10, the number of PEs, $n=5$. FIG. 10 shows the processing procedure in each PE and the distribution of the grid points supervised by each PE when continuous processing is performed for all combinations of vector data series $C_1$ and $C_2$ and vector data series $R_1$ and $R_2$. In FIG. 10, the groups of grid points enclosed in an elongated circle are processed by the same PE, and the numeral on the upper left shoulder of this enclosure indicates PE number.

In case of obtaining, for example, $S_{7,8}$ in FIG. 10, the data to be required for the calculation of $S_{7,8}$ at time $t_1$ are $S_{6,7}, S_{7,7}$ and $S_{6,8}$ obtained by PE$_4$ and PE$_5$. Since times $t_2$ and $t_3$ are in the past with respect to time $t_1$, data $S_{6,8}$ exists in PE$_5$ which calculates $S_{7,8}$, and data $S_{6,7}$ and $S_{7,7}$ exist in PE$_4$. In other words, the necessary data always exist in the adjacent PE, so that in case of executing a comparison computation of equation (2) for $S_{7,8}$, min $(S_{6,7}, S_{7,7})$ is executed in PE$_4$, and that the result is transferred to PE$_5$ where min $[S_{6,8},$ min $(S_{6,7}, S_{7,7})]$ is executed.

In this case, as explained above, in order that the input vector data series $C_1, C_2, \ldots, C_{lc}$ are divided into a number of groups equivalent to the number of PEs (n) and are inputted into the array for processing, $S_{ij}$ that corresponds to the grid points marked with an oblique line as shown in FIG. 10 must be transferred to a predetermined PE before the substitution of the input vector data starts For instance, it is necessary that $S_{5,1}$ existing in PE$_1$ is transferred to PE$_3$, $S_{5,2}$ in PE$_2$ to PE$_4$, $S_{5,3}$ in PE$_3$ to PE$_5$, $S_{5,4}$ in PE$_4$ to PE$_1$ and $S_{5,5}$ in PE$_5$ to PE$_2$, respectively.

In general, from the time which is prior by the time corresponding to $$\left( \mod_{n} \sum_{\nu=1}^{l_r} N_\nu \right)$$

time units to the substitution of n vector data series starts, that is, in the example shown in FIG. 10, from the time prior by the time corresponding to $$\frac{\mod 17 =}{5} 2$$

time units, all PEs start operations of transferring simultaneously to the respective adjacent PEs the cumulative results $S_{pn,j}(p=1, 2, \ldots)$ which are stored in the respective PE at each time. The transfer of these data is performed one at a time for each processing of the PEs, by using the time period during which the PEs are performing only the computation processing as described above in parallel with the regular processing operations in paragraphs (a), (b) and (c) described below, so that it is possible to transfer the necessary data $S_{pn,j}$ to a predetermined PE until immediately before the substitution of n input vector data series.

In the example shown in FIG. 10, in parallel with the processing for grid points $(c_1^1, r_6^2)$ in the PE$_1$, the data $S_{5,1}, S_{5,2}, S_{5,3}, S_{5,4}, S_{5,5}$ existing in the same addresses in the work memories 23-2 for PE$_1$, PE$_2$, PE$_3$, PE$_4$ and PE$_5$ are transferred to the adjacent PEs, and allocated to PE$_2$, PE$_3$, PE$_4$, PE$_5$, PE$_1$. Similarly, when the processing for grid point $(c_2^1, r_6^2)$ pf PE$_1$, the data are allocated to PE$_3$, PE$_4$, PE$_5$, PE$_1$, PE$_2$ and then the data transfer is completed.

In the processing immediately after the substitution with the next input vector data series $c_5^1, c_6^1, c_1^1, c_1^2$ that occurs at the processing time for the next grid point $(c_3^1, r_6^2)$ of PE$_1$, the processing operations (a), (b) and (c) are executed by PE$_3$, PE$_4$, PE$_5$, PE$_1$ and PE$_2$ using the data $S_{5,1}, S_{5,2}, S_{5,3}, S_{5,4}$ and $S_{5,5}$ obtained by the above-mentioned two transfers. By repeated execution of this manner of processing, each PE can execute the dynamic time warping computation equations (1), (2) and (3) regularly and sequentially.

As just described, while repeatedly alternating the input or substitution and the circular transfer of n vector data series of the input vector data series $C_u$ ($u=1, 2, \ldots, l_c$), and while inputting vector data $r_j^\nu$ ($j=1, 2, \ldots, N_\nu$) into each PE synchronized with the input and circular transfer of the above-mentioned vector data $c_i^\mu$ ($i=1, 2, \ldots, I_u$), each PE repeatedly executes the computation equations (1), (2) and (3) for each grid point, so that the processing for all grid points is completed.

Summarizing the above, the normal processing operations (usual processing) for a PE when executing the equations (1) and (2) are as follows:

(a) At the same time as vector data $c_i$ ($i=1, 2, \ldots, I$) is inputted from a leftward adjacent PE or from an external source via an input vector data bus, the vector data $c_{i-1}$ in the rightward adjacent PE is transferred, vector data $r_j$ ($j=1, 2, \ldots, N$) is inputted from the I/O bus synchronized with the transfer of these vector data, so that the above computation equation (1) is executed to obtain $D_{ij}$.

(b) The comparison computation of min $[S_{i-1,j},$ min $(S_{i-1,j-1}, S_{i,j-1})$ is performed, and $D_{ij}$ is added to this result to obtain $S_{ij}$.

(c) The comparison computation of min $(S_{i-1,j}, S_{ij})$ is performed, and the result is transferred to the adjacent PE. At the same time, the result of the comparison computation $(S_{i,j-1}, S_{i+1,j-1})$ is inputted from the leftward adjacent PE.

The operations in paragraph (a) correspond to the execution of computation equation (1), and those in paragraphs (b) and (c) correspond to the executions of computation equations (2) and (3). Each PE performs the processing operations simultaneously in the sequence of (a), (b) and (c). In other words, when (a) is being performed, all PEs are performing (a). When (b) is being performed, all PEs are performing (b).

The fundamental difference between such operations as these and the operations of an orthogonal array arrangement resides in the data transfer operation when executing equation (2). In the operation of an orthogonal array, the comparison computation of min $(S_{i,j-1}, S_{i-1,j-1})$ is performed after the cumulative result $S_{i-1,j-1}$ has been transferred to the leftward adjacent PE, while in the operations according to the present invention, $S_{i-1,j-1}$ and $S_{i,j-1}$ to be obtained at the next processing time exist in the same PE, so that the comparison computation can be executed even without transferring data.

When executing equation (4), the cumulative results can be obtained regularly in the same manner as described above by executing two types of simple operations. Namely, a single operation of (d) inputting the cumulative result from the adjacent PE, adding to this data twice the value of the inter-vector distance being executed in that PE, and outputting this added result to the adjacent PE, and an operation of (e) inputting the cumulative result from the adjacent PE, adding the intervector distance to this data and storing the result. As explained above, the present invention makes the number of PEs completely independent of the positive integers $I_u$ and $N_v$ which express the number of each vector data that are to be processed, allows for the number of PEs to be set at a suitable value in accordance with the estimated volume of data processing, and makes it possible to execute dynamic time warping computations through pipeline parallel processing that makes maximum effective use of the hardware by fully operating the PEs which execute regular processing operations repeatedly.

Consequently, when LSI techniques are used to realize an array processor, the system scale can be made extremely small in the present invention in comparison to the conventional orthogonal array in which the number of PEs is determined in accordance with the positive integers $I_u$ and $N_v$, and additionally, hardware can be used effectively. Furthermore, the present invention has the potential for expanding the number of PEs. That is, the processing for vector data series having any desired numbers $N_v$ and $I_u$ can be executed, regardless of the number of PEs.

Next, the efficiencies of the orthogonal array and the array processor according to the present invention will be compared for throughput per PE and per unit time, taking into consideration of an average utilizing rate of the PEs.

Of the two types of processing contents in the orthogonal array consisting of the above-mentioned processing operations (i) and (iii), and (ii) and (iv), it is assumed that the number of steps which is larger among the two types is $U_{square}$, and it is also assumed that the number of dynamic steps in the processing of each PE in the arrangement in accordance with the present invention consisting of the processing operations (a), (b) and (c) is $U_{ring}$. In the orthogonal array, in order to complete the matching computation based upon the dynamic time warping for one pair of vector data by adopting the method of alternate execution of the two types of processing units (i) and (iii), and (ii) and (iv), $2U_{square}$ steps are required.

In the matching computation based upon the dynamic time warping in question, if $PE_{ij}$ completes the execution of computation equations (1), (2) and (3) for a single vector data series R to obtain the cumulative result $S_{ij}$, then $PE_{ij}$ does not need to execute the processing for this vector data series R, when $PE_{i'j'}$ (i'>i, j'>j) is executing the above-mentioned computation equations. Therefore, during the execution of processing for a vector data series $R_v$, a PE which is not contributing to that processing can be allocated to the processing for another vector data series $R_{v'}$. In other words, while the cumulative result $S_{ij}$ is being calculated for a first vector data series $R_1$, the calculation of the cumulative result $S_{ij}$ can be executed also for a second vector data series $R_2$ through the phase difference of $2U_{square}$ steps. Up until the final computation result $S_{I_u,N_v}$ for vector data series $I_u$ and for vector data series $R_v$ is obtained, the number of steps (Nmax+Imax) based on a unit of the number of dynamic steps $2U_{square}$ needed in order to obtain $S_{ij}$ is required, so that (Nmax+Imax) types of final cumulative results $S_{I_u,N_v}$ can be obtained within the time period of (Nmax+Imax) steps.

On the other hand, in the present invention, the processing is repeated, which is the matching processing between input vector data series $R_1, R_2, \ldots, R_{l_r}$ and every n vector data series of the input vector data series $C_1, C_2, \ldots, C_{l_c}$, so that the final cumulative result $S_{I_u,N_v}$ is obtained.

On the basis of processing operations of the overall array as described above, the efficiency of the PEs when executing processing for all combinations of vector data series $C_1, C_2, \ldots, C_{l_c}$ and vector data series $R_1, R_2, \ldots, R_{l_r}$, will be obtained as follows:

In the case of the orthogonal array:

To obtain the final results of $l_r \cdot l_c$th, (Nmax+Imax+$l_r \cdot l_c$) steps with a unit of $2U_{square}$ are needed. Since the number of PEs is Nmax·Imax, the efficiency of the PE is given by the following equation:

$$\eta_{sq} = \frac{l_r \cdot l_c}{\frac{(Nmax + Imax + l_r \cdot l_c) \cdot 2U_{square}}{Nmax \cdot Imax}} \tag{5}$$

In the case of the present invention:

Based on $U_{ring}$ as unit of processing step, the number of processing steps during the operation for the substitution of n input vector data series n steps, and the number of processing steps to be executed while the input vector data is transferring circularly is $$\left( \sum_{v=1}^{l_r} N_v - n \right)$$

steps. The execution of the processing of input vector data series $C_1, C_2, \ldots, C_{l_c}$ is handled in a manner equivalent to the processing of a single input vector data series, so that the number of steps required to obtain the final results of $l_r \cdot l_c$th is given by the following equation:

$$\left( \sum_{v=1}^{l_r} N_v - n \right) \left( \frac{\left( \sum_{u=1}^{l_c} I_u - r_1 \right)}{n} + 1 \right) + \tag{6}$$

$$n \left( \frac{\left( \sum_{u=1}^{l_c} I_u - r_1 \right)}{n} \right) + 2n$$

The first term in equation (6) represents the number of steps during circular transfer. The second term represents the number of steps during input vector data substitution. The third term represents the number of steps at the first and last stages in the whole matching processing. Furthermore, $$r_1 = \underset{n}{\mathrm{mod}} \sum_{u=1}^{l_c} I_u.$$

Since there are n PEs, the efficiency $\eta_{ring}$ of the PE is:

$$\eta_{ring} = \frac{l_r \cdot l_c}{\left\{ \left( \sum_{v=1}^{l_r} N_v \right) \left( \left( \sum_{u=1}^{l_c} I_u - r_1 \right) + 1 \right) + n \right\} \cdot U_{ring}} \cdot n \quad (7)$$

If $N_{av}$ is the mean number of $N_1, N_2, \ldots, N_{lc}$ and $I_{av}$ is the mean number of $I_1, I_2, \ldots, I_{lc}$, $$\sum_{v=1}^{l_r} N_v = l_r \cdot N_{av}, \quad \sum_{u=1}^{l_c} I_u = l_c \cdot I_{av},$$

so that equation (7) is rewritten as follows:

$$\frac{\eta_{ring}}{\eta_{sq}} = \frac{N_{max}}{N_{av}} \cdot \frac{I_{max}}{I_{av}} \cdot \qquad (8)$$

$$\frac{\left(1 + \frac{N_{max} + I_{max}}{l_r \cdot l_c}\right)}{1 + \frac{n - r_1}{l_c I_{av}} + \frac{n^2}{l_c I_{av}}} \cdot \frac{2 U_{square}}{U_{ring}}$$

The denominators and numerators apart from 1 in the third term of equation (8) relate to the efficiency of each array configuration at the first and last stages in the whole matching processing. Accordingly, the ratio of the efficiencies of the PEs during the execution of processing is expressed as follows:

$$\frac{\eta_{ring}}{\eta_{sq}} \simeq \frac{N_{max}}{N_{av}} \cdot \frac{I_{max}}{I_{av}} \cdot \frac{2 U_{square}}{U_{ring}} \qquad (9)$$

If it is assumed that each PE in an orthogonal array has a means for allowing simultaneous execution of input and output operations, then $2U_{square} \simeq U_{ring}$ and $N_{max} > N_{av}$, $I_{max} > I_{av}$, so that the arrangement according to the present invention always provides an improved efficiency higher than the orthogonal array. When, for example, $N_{av} = \frac{3}{4} N_{max}$ and $I_{av} = \mu I_{max}$, then the arrangement according to the present invention has an efficiency approximately 1.8 times higher than the orthogonal array. Moreover, if the conventional arrangement has a means only for executing input and output operations alternately during each processing in every PE, then $2U_{square} < U_{ring}$. This means that the relative efficiency of the array processor according to the present invention is even higher in comparison to that of the orthogonal array.

The system scale size in the case of the orthogonal array has been extremely large due to the need to dispose and connect at least ($N_{max} \times I_{max}$) PEs. Thus, in the conventional arrangements, a serial bit method has been employed for the input and output of each PE in order to make a size of the PE compact. However, because the data to be processed in the matching computation in the dynamic time warping under consideration here are vector data in which data series of a particular dimension as a single data shown in equation (1), the number of transfer steps between PEs increases extremely, if data input/output is executed in the form of serial bit streams, and accordingly the overall computations require a longer time. On the other hand, in the arrangement according to the present invention, the number of PEs can be reduced significantly so that no problems arise with respect to array processor size, even if parallel data transfer between PEs is employed, and the arrangement in accordance with the present invention is well suited to the processing of vector data such as those handled in the matching computation based upon dynamic time warping under consideration here.

Although the above explanation deals principally with the dynamic time warping computations shown in equations (1), (2) and (3), the present invention is not limited to these computations, but can also be applied in the same manner to the case as described above in which, for example, equation (2) is substituted by equation (4), or otherwise, to the execution of computations for all combinations of two types of variables and for any recursive formula equation with local dependency of data using these computation results.

In an array processor according to the present invention, processing elements having predetermined I/O means and computation means are connected in the form of a ring through multiplexers which selects one of a data transfer path for exchanging data with adjacent processing elements and an external input bus. Furthermore, such processing elements are so arranged that the simultaneous transfer of the respective processing results by all processing elements to adjacent processing elements are executed a predetermined number of times in parallel with the usual processing in each processing element. This arrangement makes it possible to realize computations for all combinations of two types of variables and for any recursive formula equation with local dependency of data using these computation results, which are typical to the matching computation of dynamic time warping with an array arrangement formed by a suitable number of processing elements corresponding to the amount of computation to be performed by high-efficiency parallel processing while operating all processing elements with a high efficiency.

In computation processing such as expressed by equations (1)–(3), $S_{i,N}$ is required as the final processing result. A control method of an array processor according to the present invention will now be explained with reference to the case in which the above-mentioned dynamic time warping computations are executed in respect of all combinations of a single vector series C and 1 vector series $R_p$ (p=1, 2, ..., 1) to obtain $S_i^p$, $N_p$ as a final result.

Figure 11:
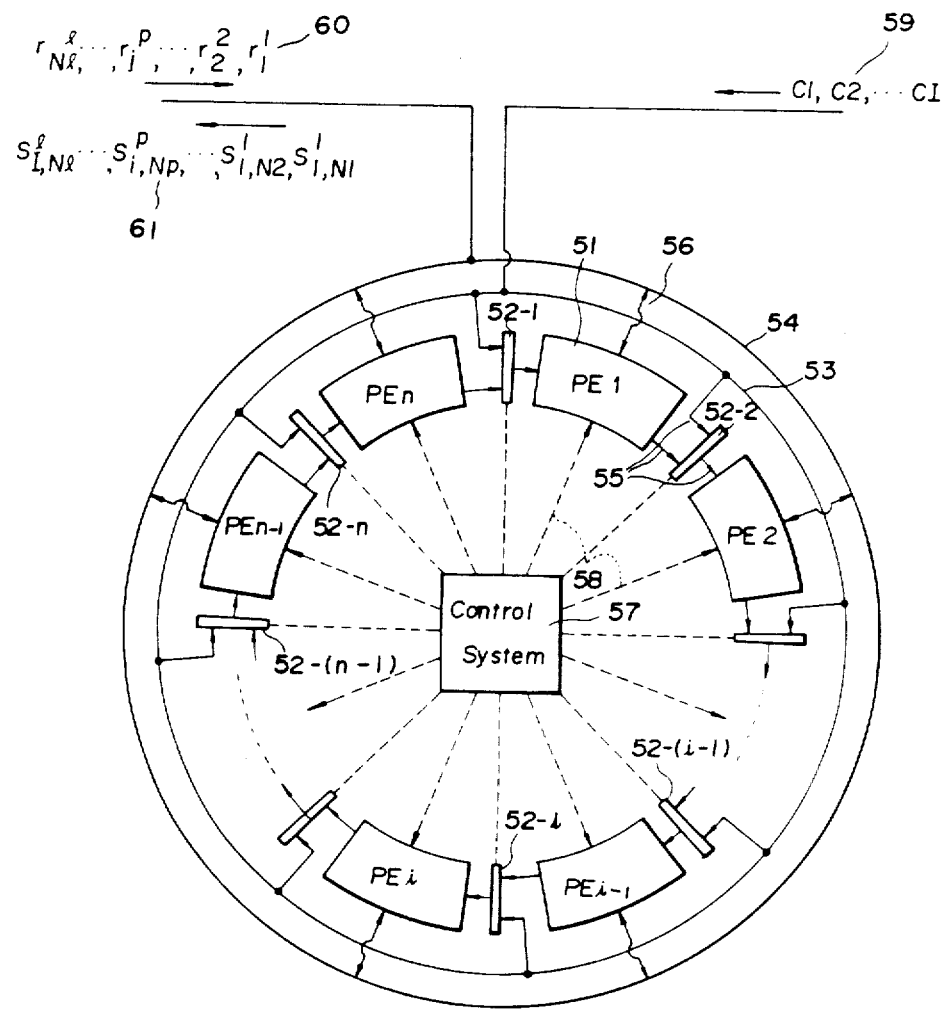
FIG. 11 is a block diagram showing another embodiment of an array processor according to the present invention in which the processing elements are disposed and connected in the form of a ring.

FIG. 11 shows an embodiment of an arrangement of an array processor in which processing elements (PEs) are disposed and connected in the form of a ring. In FIG. 11, it is assumed that the number of PEs is n ($n \leq N_p$). A control method according to the present invention will be applied to this array processor.

In FIG. 11, reference numeral 51 denotes a PE that contains an arithmetic unit for executing the addition and subtraction, comparison computations and product-sum computations required to execute the above-mentioned equation (1). This PE 51 has a register for executing data exchange with an adjacent PE and data exchange with an external source, a memory for storing results of computations and transferred data and a controller for controlling each section of a microprogram memory which contains PE processing operations. Reference numerals 52-1-52-n denote multiplexers that select one of an external bus 53 that inputs, n (corresponding to the number of PEs) input vector data $c_i$ from an external source at a time, and a data transfer path 55 that transfers input vector data $c_i$ from an adjacent PE. Reference numeral 54 denotes an I/O bus used when inputting input vector data $r_i^p$ and when outputting the final results of the computations $S_i^p, N_p$ to an external destination. The data transfer path 55 transfers the data $c_i$ and the intermediate results of computations $S_{ij}^p$ ($j=1, 2, \ldots, N_p-1$) among PEs. Reference numeral 56 denotes I/O terminals of each PE connected to the I/O bus 54. Reference numeral 57 denotes an overall control system such as a host computer which provides control signals 58 to each PE. Reference numerals 59, 60 and 61 denote, respectively, an input vector data series C, input vector data series $R_p$ ($p=1, 2, \ldots, l$) and final results of computations $S_i^p, N_p$ ($p=1, 2, \ldots, l; i=1, 2, \ldots, I$).

In an array processor with such an arrangement, the sequence for executing dynamic time warping computations based on the above equations (1) to (3) is as follows.

A data series obtained by dividing an input vector data series C into series of n data (equal to the number of PEs) are expressed as follows:

$$S_k = (C_{kn+1}, C_{kn+2}, \ldots, C_{kn+q}, \ldots, C_{(k+1)n})$$

,where $k=0, 1, 2, \ldots$ ; $q=1, 2, \ldots, n-1$ and $kn+q \leq = I$. The processing sequence includes repeating execution of the following (I)-(V) procedures for $k=0, 1, 2, \ldots$ (I) The multiplexer for the PE located in the $$\mod_n \left( \sum_{p=1}^{l} N_p \right) th$$

sequence counting from the PE in which processing between input vector data series $S_{k-1}$ and all input vector data series $R_p$ ($p=1, 2, \ldots, l$) start is switched to the external bus to accept the input of a subsequent input vector data series $S_k$. Synchronized with this data input, the computation processing for all input data series $R_p$ starts, while input vector data $r_i^p$ is inputted successively into each PE. When $k=0$, the multiplexer for any one PE is switched to the external bus, and this processing is executed.

(II) The input vector data series $S_k$ is inputted to the array, and when the data which form $S_k$ are assigned to the various PEs, all multiplexers select the path for data transfer between PEs. At the same time data are transferred circularly between PEs in all the PEs, and while the input data $r_i^p$ are being inputted successively into each PE synchronized with the transfer of these data, the computation processing based on the above equations (1)-(3) is executed for all input data series $R_p$.

(III) In the processing in procedures (I) and (II), the computation result $S_{ip}^p, N_p$ for each input vector data series $R_p$ is outputted to an external destination.

(IV) In the processing in procedures (I) and (II), the computation result $S_{(k+1)n,i}^p$ for the last data $c_{(k+1)n}$ in each input vector data series $S_k$ is stored in the internal memory of the PE in charge of that computation.

(V) In the processing in procedures (I) and (II), $$\mod_n \left( \sum_{p=1}^{l} N_p \right)$$

processing times before (the processing time indicative of the time required for each PE to execute the processing in every PE) the time at which the substitution of input data series $S_k$ begins to be performed, each PE transfers simultaneously a single datum of the computation result stored in its internal memory, once each processing time. That is, the transfer is performed $$\mod_n \left( \sum_{p=1}^{l} N_p \right)$$

times in total.

Furthermore, during the circular transfer of the input vector data $c_i$, the transfer of the computation results between PEs in all the PEs is repeated at every $$\left( n - \mod_n \left( \sum_{p=1}^{l} N_p \right) \right)$$

processing times. A single computation result for each PE is transferred once per processing time, that is $$\mod_n \left( \sum_{p=1}^{l} N_p \right)$$

transfers in total.

A control method according to the present invention for controlling such processing will be explained in paragraphs (A) and (B) below.

FIG. 12 shows an example of flags to be added to the input vector data to embody the control method in accordance with the present invention. Reference numerals 61 and 62 denote flags showing the head and tail of each data series. Reference numeral 63 denotes flags for setting the timing for simultaneous transfer of the computation results of all PEs immediately before the substitution of the input vector data series $S_k$, and reference numeral 64 denotes an input vector data $r_i^p$.

(A) As shown in FIG. 12, for each input vector data series $R_p$, the three bits of the flags 61 and 62 for indicating the head and tail of each data series and the flag 63 for setting the timing for the simultaneous transfer of the computation results of all PEs immediately before the substitution of the input vector data series $S_k$, are added to the corresponding input vector data $r_i^p$.

(B) Each PE has a status flag register for storing the information for judging the role that each PE must play in the processing of the overall array, such as the input condition of the input vector data $r_i^p$ and the counting operations for the number of simultaneous transfers (hereinafter referred to as reallocation processing) of the computation results among all PEs.

Figure 13:
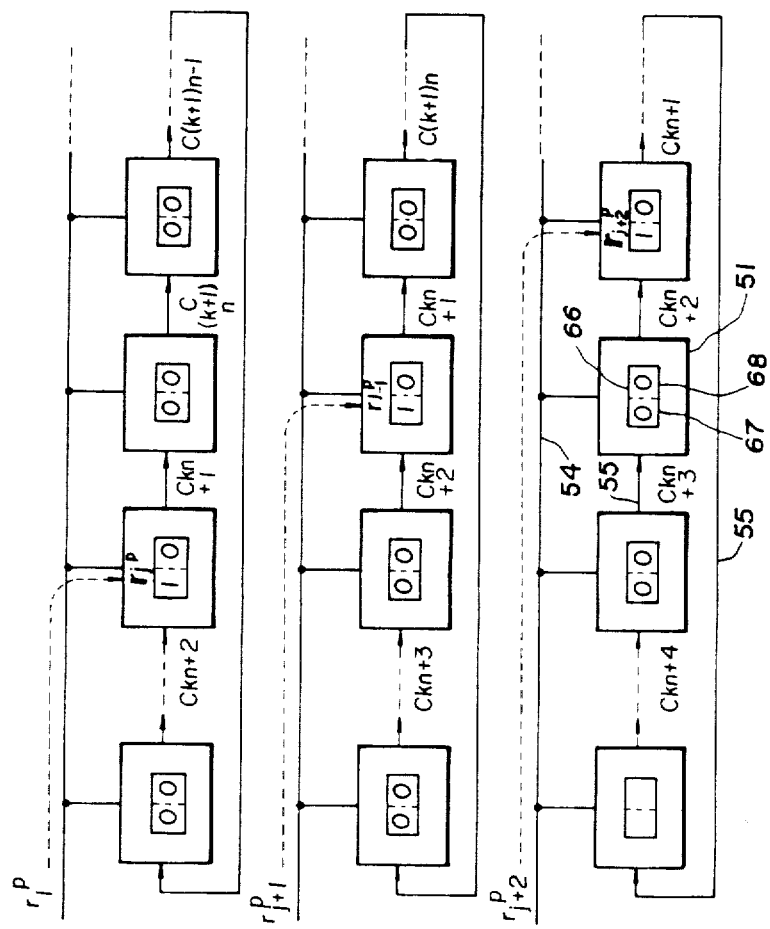
FIG. 13 is a block diagram illustrating an example of control operations of a condition flag register inside the processing element.

FIG. 13 shows an example of a control operation of a status flag register in a PE. It shows an operation for inputting input vector data $r_i^p$ successively into each PE. Reference numeral 66 denotes a status flag register that consists of an input flag 67 specifying an input condition of input vector data $r_i^p$ and a count flag 68 for counting the number of transfers necessary in the reallocation processing.

Reference numeral 51 denotes the PE. Reference numeral 54 denotes the external I/O bus. Reference numeral 55 the path for data transfer between PEs.

The contents of the status flag register 66 are transferred to an adjacent PE at each processing time, and play the role of setting the respective status in each PE before the start of processing at the subsequent time. The input vector data $r_i^p$ is inputted into the PE whose flag 67 is "1". The contents of the status flag register 66 are transferred successively at every processing time to an adjacent PE, so that the input vector data $r_i^p$ is inputted successively into each PE. At this time, the input vector data $c_i$ are circularly transferred between PEs of all the PEs synchronized with the successive inputting of the input data $r_i^p$.

At initial setting, the flag 67 in the status flag register of any one of the PEs is set at "1", and the flags 67 in the remaining PEs are set at "0".

The two types of control means mentioned in paragraphs (A) and (B) are combined so that the procedure for performing the control of operations of an array processor according to the present invention as described above will be explained in accordance with the abovementioned operations (I)–(V).

FIGS. 14A–14E illustrate an example of a control operation when the array processor in FIG. 11 executes the matching computation based upon dynamic time warping in case of $n=5$, $l=2$, $N_1=6$, $N_2=7$.

In these drawings, reference numeral 51 denotes the PE, reference numeral 52 the multiplexer for selecting one of the data transfer path 55 and the external bus 53 and reference numeral 54 denotes the external I/O bus. Reference numeral 66 denotes the status flag register which consists of the flag 67 for specifying the input condition for input vector data $r_i^p$ and the flag 68 for performing count operation of the number of transfers performed during reallocation processing. Reference numeral 69 denotes the data to be reallocated by the reallocation processing at each processing time. Throughout the following explanation, the above-mentioned various flags shall be referred to as follows.

Flags added to input vector data $r_i^p$:

Flag 61 ... "head" flag
Flag 62 ... "tail" flag
Flag 63 ... "transfer" flag

Flags in the status flag register 66:

Flag 67 ... "input" flag
Flag 68 ... "count" flag

FIGS. 14A–14E illustrate the processing operations of the PE at every processing time from the processing time $(t+1)$ that input vector data series $S_1=(c_1, c_2, c_3, c_4, c_5)$ is replaced by input vector data series $S_2=(c_6, c_7, c_8, c_9, c_{10})$ until the processing time $(t+20)$ that the next input vector data series $S_3=(c_{11}, c_{12}, c_{13}, c_{14}, c_{15})$ is substituted for the input vector data series $S_2$, and the control conditions at every moment of those processing times. The unit of time is the time required for each PE to execute the processing according to the above equations (1)–(3) in each PE.

The processing time $(t+1)$ corresponds to the time which is prior by $$\text{mod}(N_1 + N_2) = \text{mod}(6 + 7) = 3$$
$$\quad n \qquad\qquad\quad 5$$

time intervals to the processing time $(t+4)$ that the processing begins substituting input vector data series $S_2$ with $S_1$. Immediately before this processing time $(t+1)$, a control signal (hereinafter referred to as a "substitute" signal) instructing the execution of substitution of input data series $S_k$ is transmitted to each PE. Only $PE_1$, which stores information indicating the first PE in which processing for inputting data series $S_1$ is started, accepts this "substitute" signal, and prepares to start the reallocation processing.

The control means described above in paragraph (II) adds a "transfer" flag "1" to the last five data $r_3^2$, $r_4$, $r_5^2$, $r_6^2$, $r_7^2$ of the input vector data series $R_1$ and $R_2$. Thus, the $PE_1$ whose "input" flag in the status flag register is "1" at the processing time $(t+1)$, accepts the data $r_5^2$ among these data to judge that the "transfer" flag is "1" to recognize the start of the reallocation processing, and sets the "count" flag to "1". At the same time, the "count" flag is judged to be "1", and all PEs are successively informed of the start of the reallocation processing (in the direction of the arrow on the broken lines in the drawings). All PEs are then set to a transfer condition for the reallocation processing.

Next, during the processing time, the result of that computation is also transferred by all PEs in parallel with the computation processing based on the above equations (1)–(3). At the processing time $(t+1)$, the computation results $S_{5,1}^1$, $S_{5,2}^1$, $S_{5,3}^1$, $S_{5,4}^1$, $S_{5,5}^1$ (obtained, respectively, in $PE_1$, $PE_2$, $PE_3$, $PE_4$ and $PE_5$) are read out in each PE, which are the first transfer data, from its internal memory, and transferred to an adjacent PE by the processing at this time. Therefore, these data $S_{5,5}^1$, $S_{5,1}^1$, $S_{5,2}^1$, $S_{5,3}^1$ and $S_{5,4}^1$ are reallocated in the $PE_1$, $PE_2$, $PE_3$, $PE_4$ $PE_5$, respectively, until the start of the processing at the processing time $(t+2)$. The input vector data $r_6^2$ to be inputted into $PE_2$ at the processing time $(t+2)$ do not contain information for resetting the status of the reallocation processing, so that the reallocation processing continues also at this time. Then, before the processing starts at the processing time $(t+3)$, these data are reallocated in the order of $S_{5,4}^1$, $S_{5,5}^1$, $S_{5,1}^1$, $S_{5,2}^1$ and $S_{5,3}^1$.

By repeating this manner of processing, these data are reallocated in predetermined PEs in the order of $S_{5,3}^1$, $S_{5,4}^1$, $S_{5,5}^1$, $S_{5,1}^1$ and $S_{5,2}^1$ before the processing at the processing time $(t+4)$ starts. For example, $S_{5,1}^1$ reallocated in $PE_4$ is used immediately in the processing at the processing time $(t+4)$ to obtain $S_{6,1}^1$ of this $PE_4$. The same is applicable for the other data, so that $S_{5,2}^1$ reallocated in $PE_5$ is used to obtain $S_{6,2}^1$ at the processing time $(t+5)$. At the processing time $(t+4)$, data $r_1^1$ whose "head" flag is "1" is included in $PE_4$, so that this flag is judged and recognized that the reallocation processing is completed, and the "transfer" flag in the status flag register is reset. At the same time, this reset is confirmed, and all PEs are notified (in the direction of the arrows on the broken line in the drawings) of the completion of the reallocation processing, and the reallocation processing status setting is cleared in all PEs. Accordingly, at the processing time $(t+4)$, only the processing according to the above equations (1)–(3) is executed in every PE.

Figure 14A:
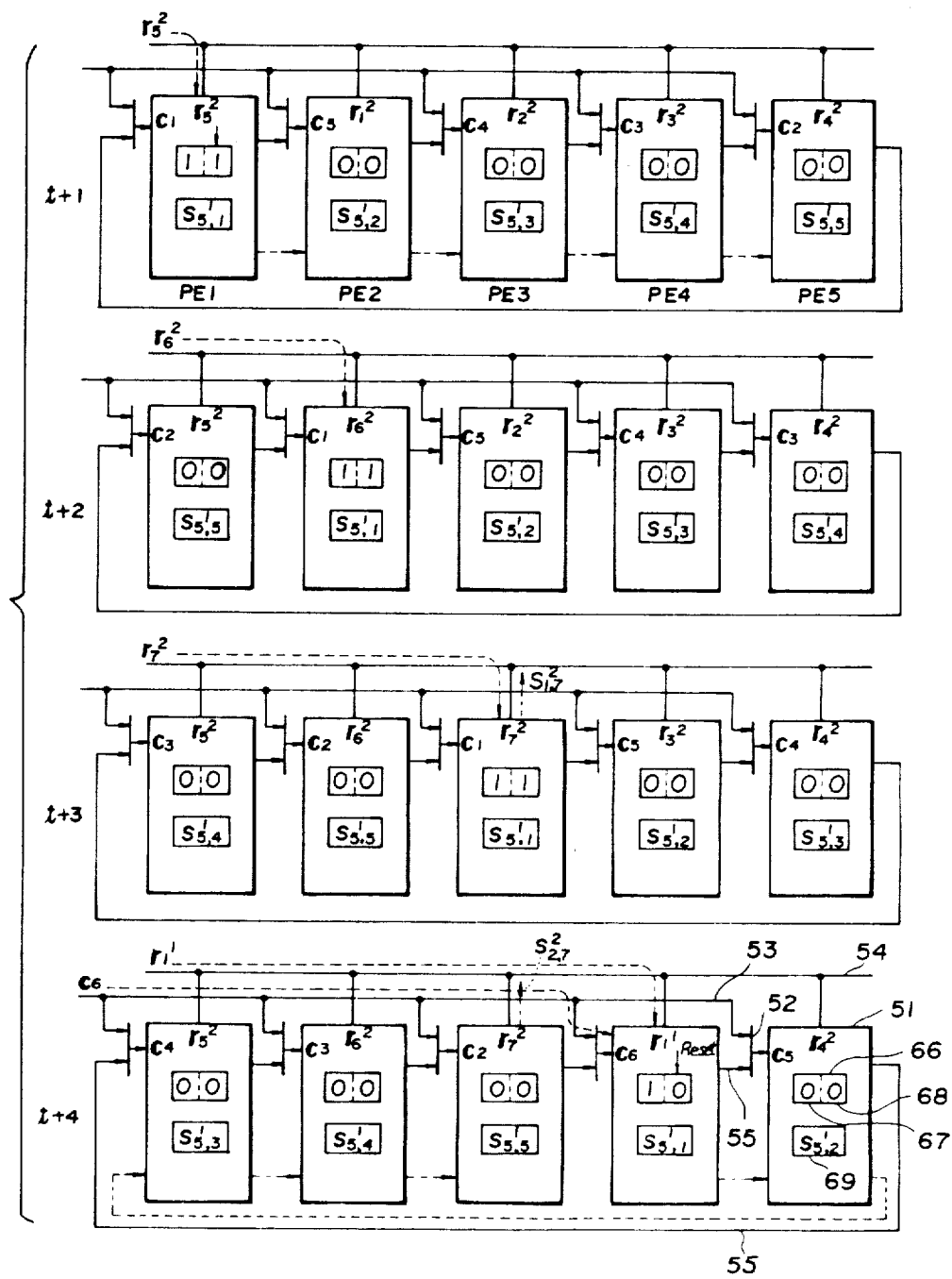
FIGS. 14A-14E are explanatory diagrams illustrating an example of control operations when a dynamic time warping computation is executed in the array processor shown in FIG. 11.
Figure 14B:
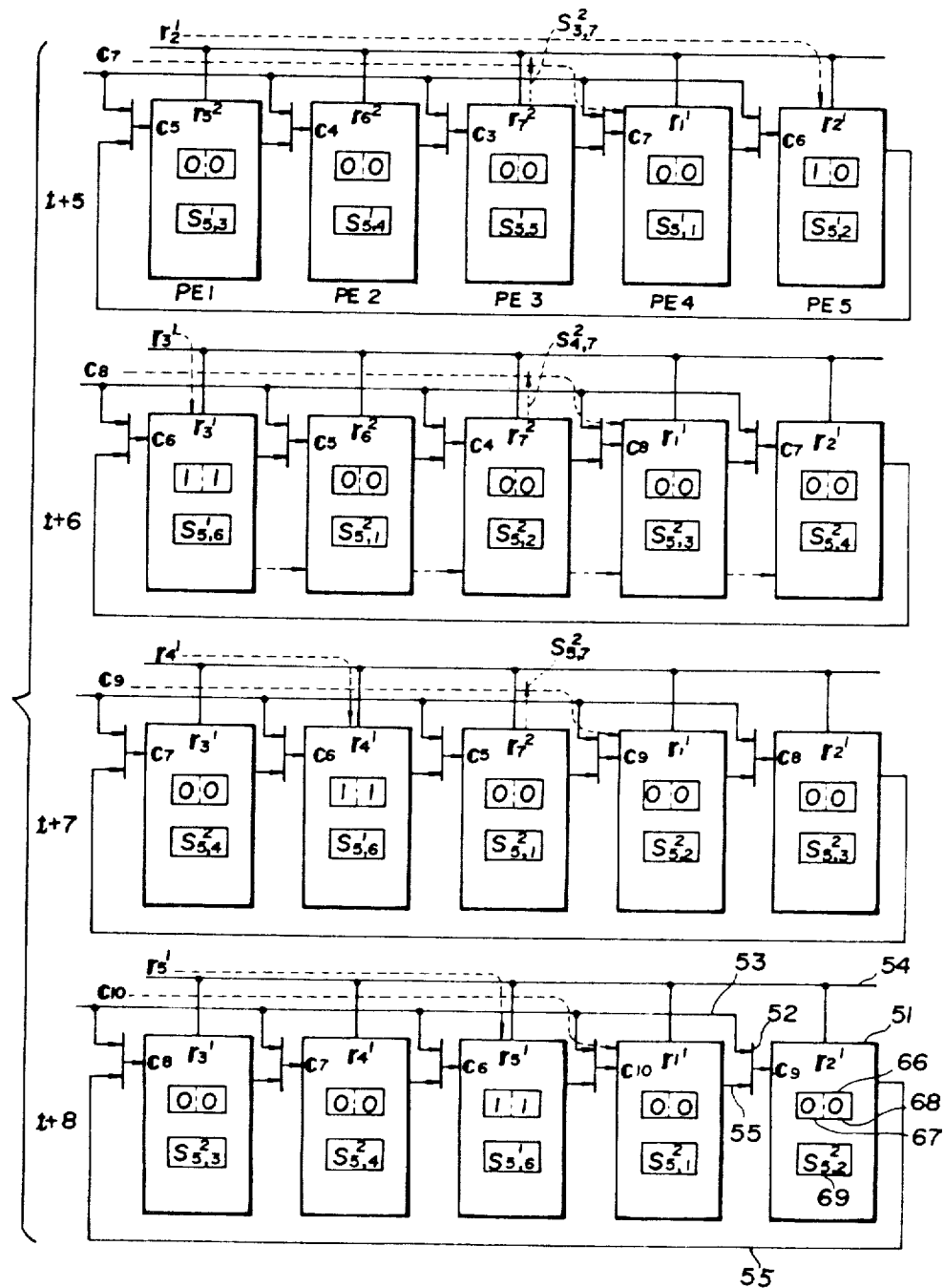
Figure 14C:
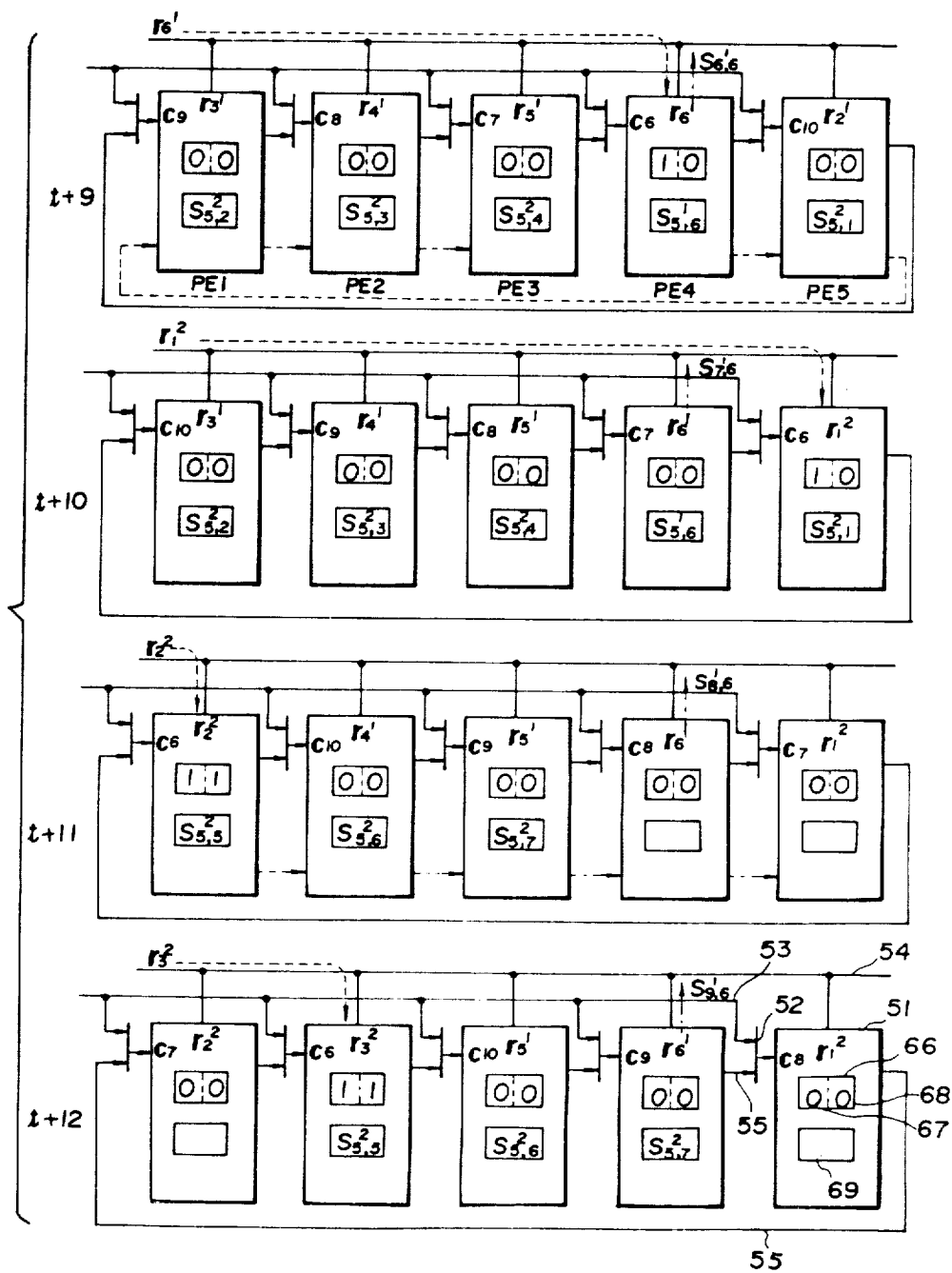
Figure 14D:
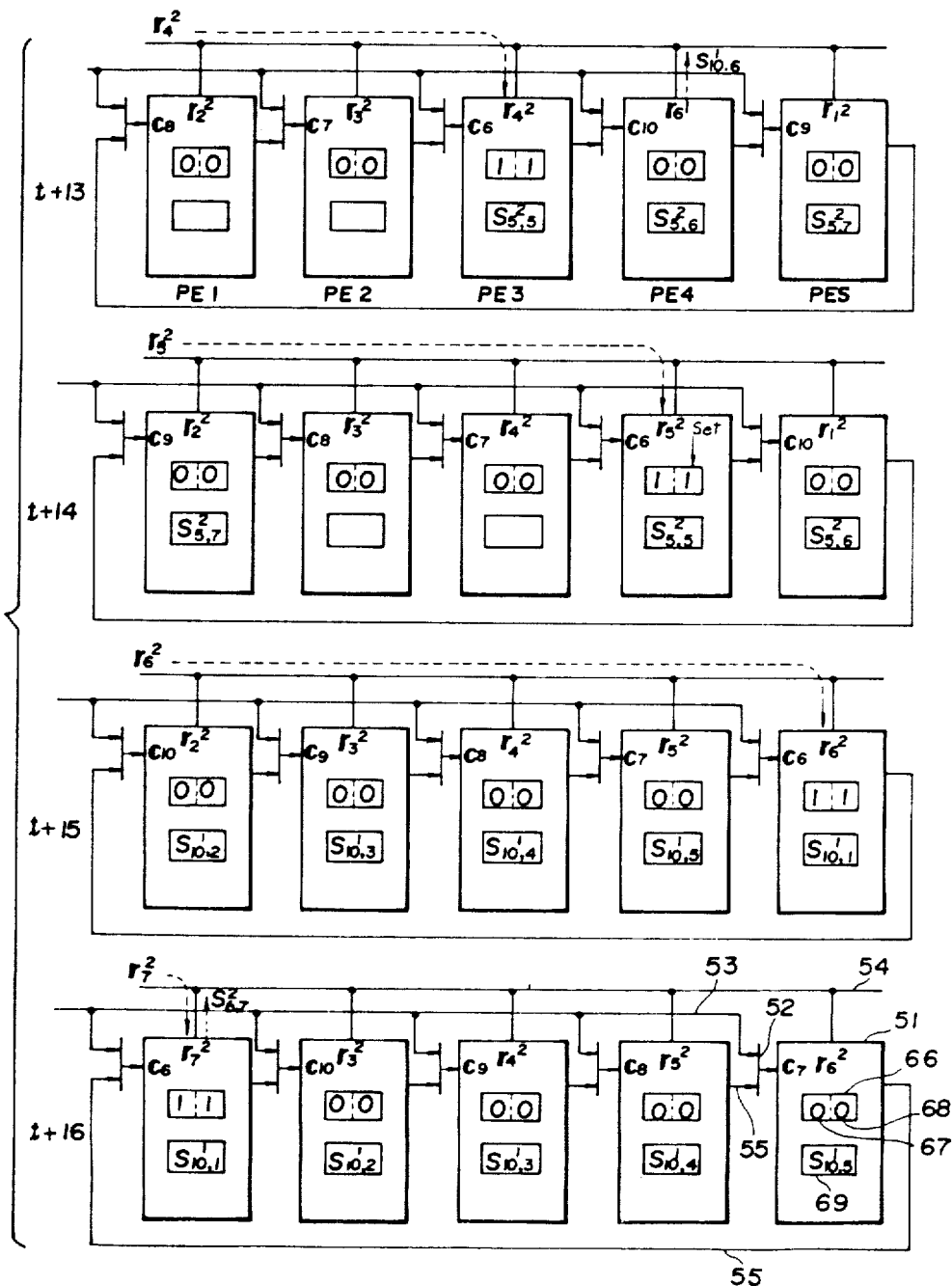
Figure 14E:
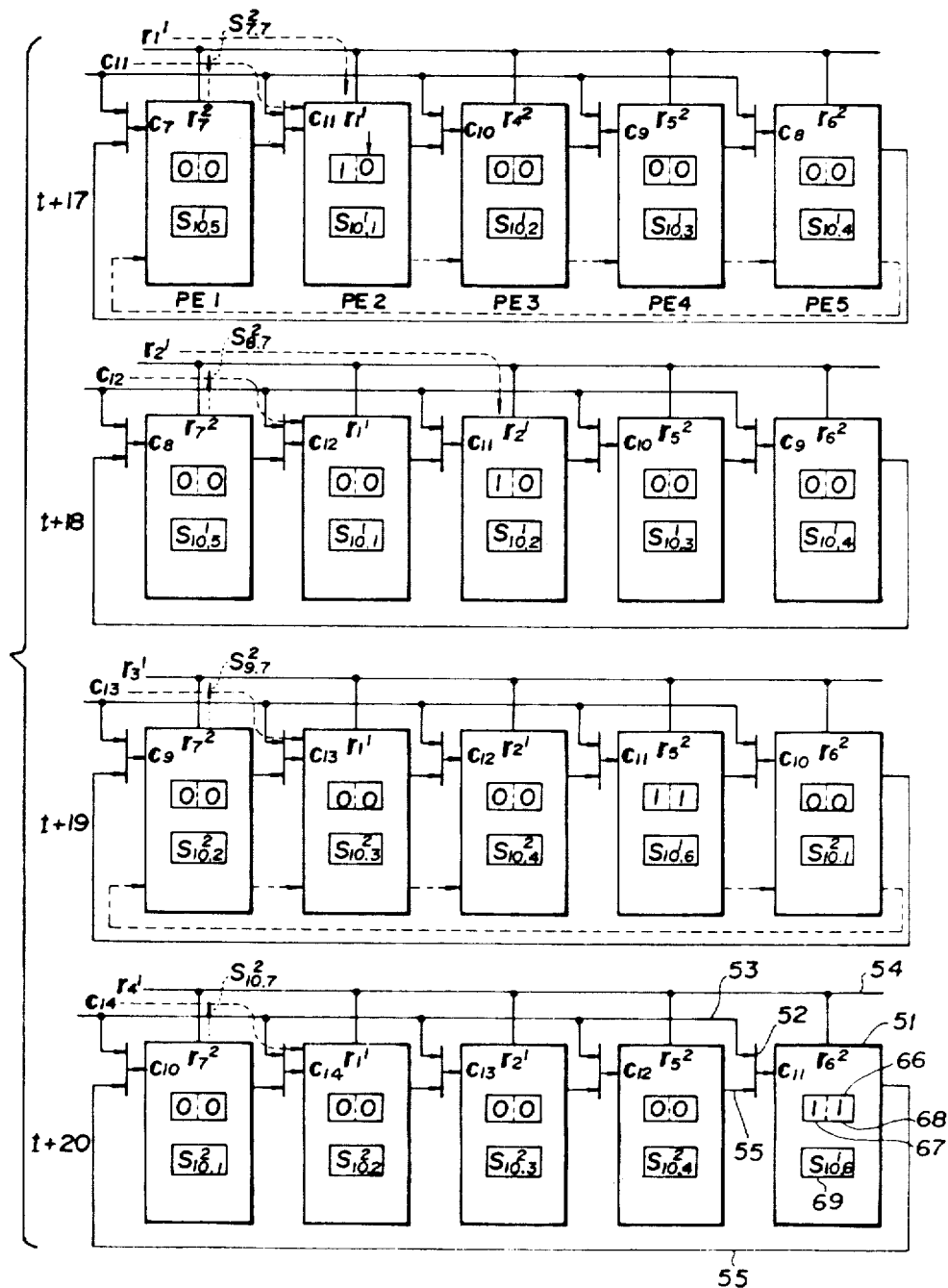

Furthermore, after a "substitute" signal is inputted to each PE from the overall control system, the first PE which has accepted input vector data in which the "head" flag is "1" recognizes that this PE is the first PE, called by the starting PE, which executes the processing for that input vector data series $S_k$, and the multiplexer managed by that PE is switched to the external bus to become the input port for the input vector data series $S_k$. Then, the information indicating the first PE for the processing is stored in that PE. This manner of control operation starts the substitution of input vector data series. In FIG. 14A, $PE_4$ executes this operation at the processing time $(t+4)$.

The PEs which were the starting PE or terminating PE, which execute the computation for first input vector data in the whole vector data series $R_1, R_2, \ldots, R_I$, of the count operations in the reallocation processing store the information for that starting PE or terminating PE inside of the PEs until the starting PE or terminating PE of the reallocation processing for the subsequent input data series $S_{k+1}$ is generated. Then, operations are restarted at each time that an "input" flag of the status flag register appears in those PEs, and the above-mentioned reallocation processing is executed. In the example shown in FIG. 14B, the second reallocation processing is performed during the time period from the processing times $(t+6)$ to $(t+8)$. The computation results $S_{5,6}{}^1$, $S_{5,1}{}^2$, $S_{5,2}{}^2$, $S_{5,3}{}^2$ and $S_{5,4}{}^2$, which are the second transfer data for each PE, are reallocated in predetermined PEs by the second reallocation processing during the time period from the processing times $(t+6)$ to $(t+8)$. The computation results $S_{5,5}{}^2$, $S_{5,6}{}^2$ and $S_{5,7}{}^2$ are reallocated in predetermined PEs by the third reallocation processing during the time period from the processing times $(t+11)$ to instant $(t+13)$.

At the processing times $(t+14)$, the reallocation processing for the input vector data series $S_1$ based on the count operations between the PEs that are the starting PE and terminating PE of the reallocation processing, is completed. The information indicating the starting PE of the processing for the input vector data series $S_2$ set in $PE_4$ and the "substitute" signal sent from the overall control system immediately before this processing time are checked, and the "transfer" flag added to the input vector data $r_5{}^2$ is judged to be "1". The "count" flag of the status flag register is then set immediately.

Thereafter, the processing procedure described above is repeated following processing time $(t+15)$.

On the other hand, the PE which executed processing for the input vector data $r_6{}^1$ and $r_7{}^2$ "tail" flags judges that these flags are "1", then outputs to an external destination the computation result $S_i{}^p$, $N_p$ in parallel with the computation processing according to the above equation (1)–(3).

In FIGS. 14A-14E, the result $S_{1,7}{}^2$ is outputted at the processing time $(t+3)$, $S_{2,7}{}^2$ at the processing time $(t+4)$, $S_{3,7}{}^2$ at the processing time $(t+5)$, $S_{4,7}{}^2$ at the processing time $(t+6)$, $S_{5,7}{}^2$ at the processing time $(t+7)$, $S_{6,6}{}^1$ at the processing time $(t+9)$, $S_{7,6}{}^1$ at the processing time $(t+10)$, $S_{8,6}{}^1$ at the processing time $(t+11)$, $S_{9,6}{}^1$ processing time $(t+12)$, $S_{10,6}{}^1$ at the processing time $(t+13)$, $S_{6,7}{}^2$ at the processing time $(t+16)$, $S_{7,7}{}^2$ at the processing time $(t+17)$, $S_{8,7}{}^2$ at the processing time $(t+18)$, $S_{9,7}{}^2$ at the processing time $(t+19)$ and $S_{10,7}{}^2$ at the processing time $(t+20)$. Thus, the results of computations for the input vector data series $S_2$ are outputted to external destinations in the sequence of $S_{6,6}{}^1$, $S_{7,6}{}^1$, $S_{8,6}{}^1$, $S_{9,6}{}^1$, $S_{10,6}{}^1$, $S_{6,7}{}^2$, $S_{7,7}{}^2$, $S_{8,7}{}^2$, $S_{9,7}{}^2$ and $S_{10,7}{}^2$.

The information indicating the starting PE of the processing for each input vector data series $S_k$ is reset after the "transfer" flag has been judged to be "1" and it has been confirmed that the "count" flag is set to "1". Moreover, when the "transfer" flag is "1", the information indicating the starting PE of the reallocation processing is set to "1", if the "count" flag is "0" and the information is not changed, if this "count" flag is "1". When the "transfer" flag is "1", the information indicating the terminating PE of the reallocation processing is set to "0", if the "count" flag is "1" and the information is not changed if this "count" flag is "0". After the multiplexer selects the external bus, the multiplexer maintains the selection of the external bus until the "input" flag of the status flag register changes to "1", and after judging that the "input" flag is "1", the multiplexer selects the path for the transfer of data between PEs.

As explained above, the contents of the status flag register and the flag added to the input vector data $r_j{}^p$ play the role of determining the processing status of each PE immediately before the execution of the computation processing according to the above equation (1)–(3). As a result, this control method does not require control signals from the overall control system specifying the processing operations in the respective PE. It is sufficient that a control signal indicating the timing for substitution of the input vector data series $S_k$ be provided cyclically to each PE. This arrangement makes it possible to perform dynamic time warping computations continuously according to the above equations (1)–(3), while executing autonomous control in the overall array processor.

Figure 15:
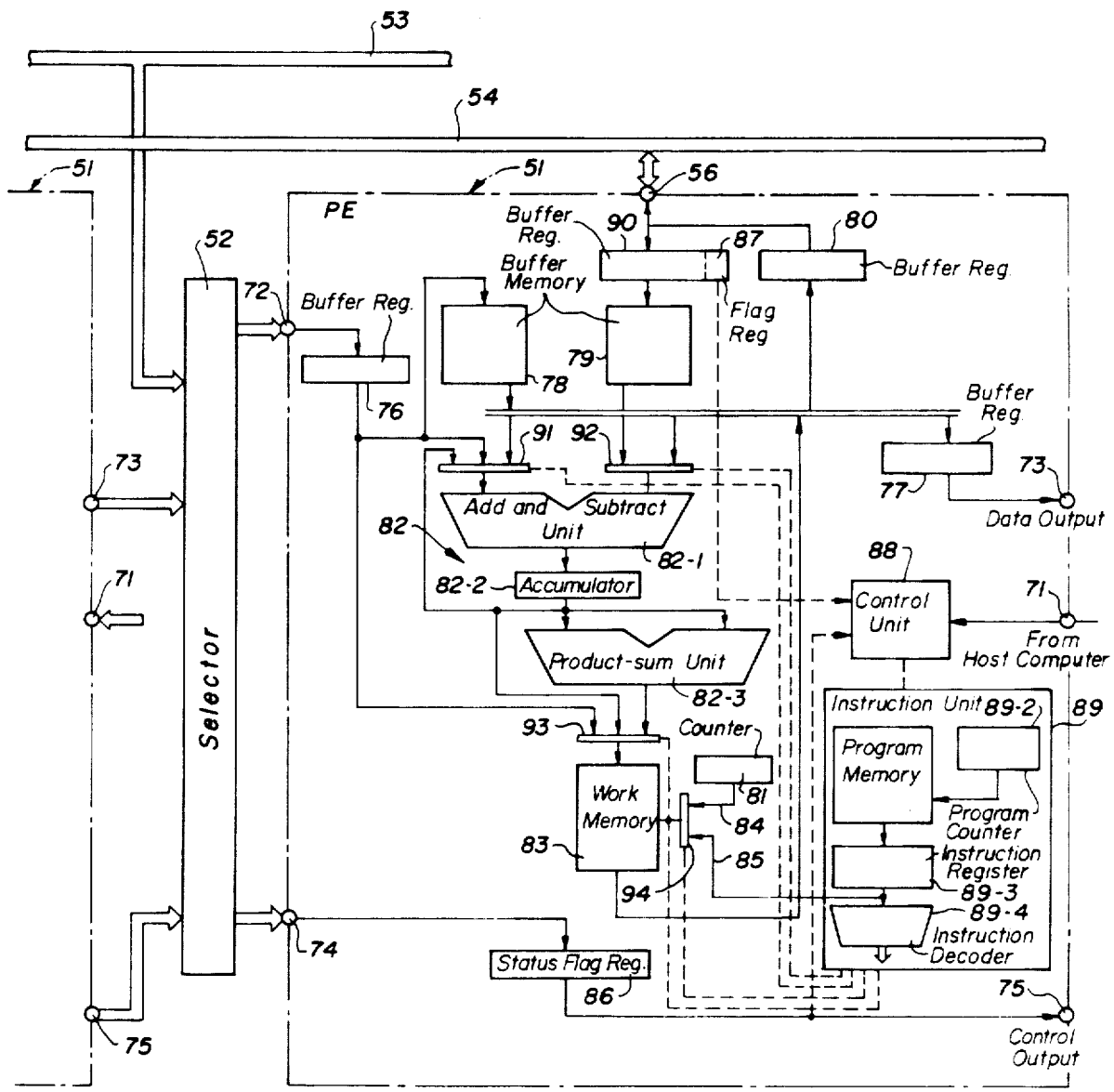
FIG. 15 is a block diagram showing an embodiment of a hardware arrangement in which a control unit embodying the control method of the present invention is incorporated into the processing elements as a part of the array processor.
Figure 16A:
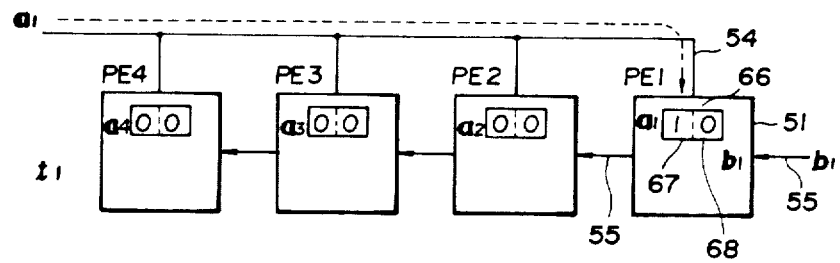
FIGS. 16A-16I are explanatory diagrams illustrating an example of control operations when a matrix multiplication is executed in an array processor with an orthogonal arrangement.
Figure 16B:
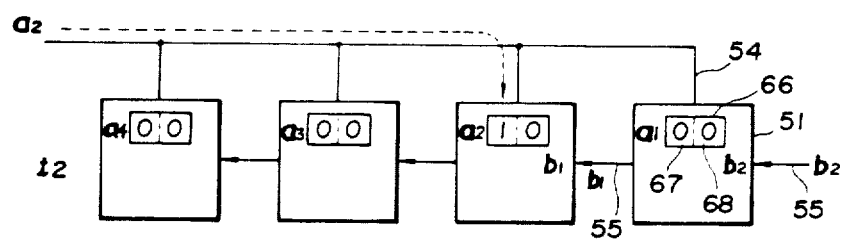
Figure 16C:
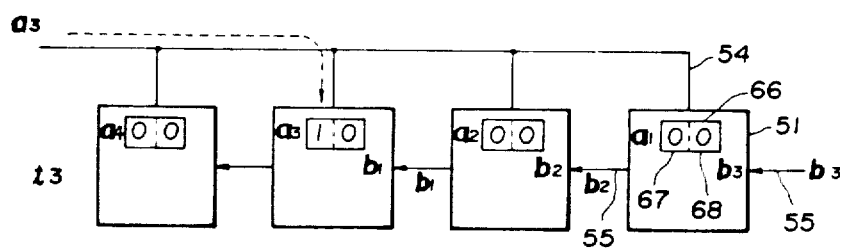
Figure 16D:
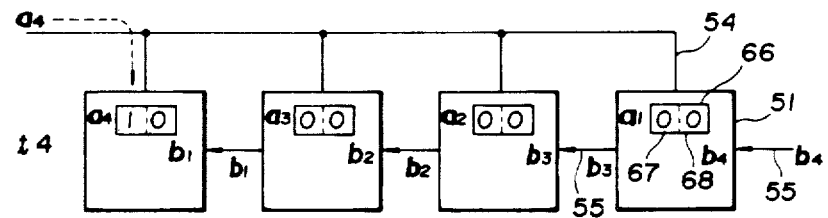
Figure 16E:
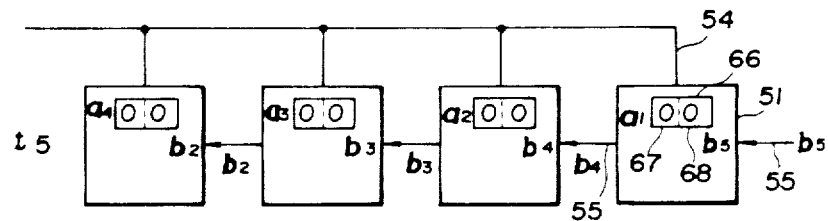
Figure 16F:
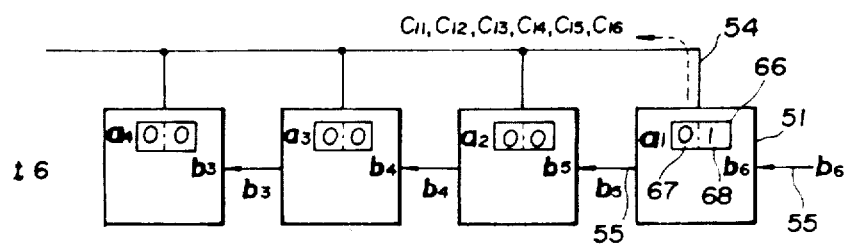
Figure 16G:
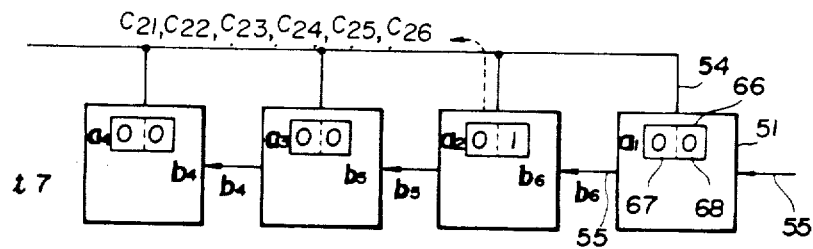
Figure 16H:
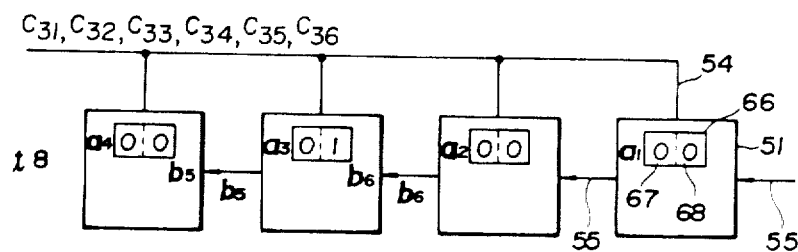
Figure 16I:
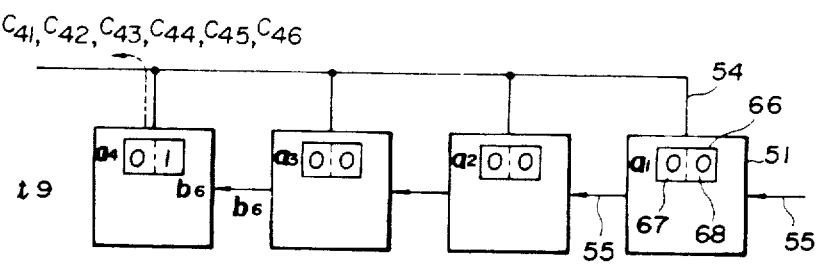

FIG. 15 shows an embodiment of a hardware arrangement when a means embodying the control method according to the present invention is included in a PE that forms this array processor.

In FIG. 15, the external input vector data bus 33, the external I/O bus 34 and the terminal 36 connecting the PE and the external I/O bus 34 are the same as those in FIG. 11. Reference numeral 71 denotes a control input terminal to a control unit 88 from a control signal source such as a host computer. Reference numerals 72 and 73 denote input and output terminals of the paths for transfer of data between PEs, respectively. Reference numerals 74 and 75 denote input and output terminals of a status flag register 86. Reference numerals 76 and 77 denote input and output buffer registers for data transfer. Reference numerals 78 and 79 denote buffer memories for input vector data $c_i$ and $r_j$. Reference numeral 80 denotes a buffer register for output data to the external I/O bus 34. Reference numeral 81 denotes a counter for memory access. Reference numeral 82 denotes an arithmetic unit having an add and subtract unit 82-1, an accumulator 82-2 and a product-sum unit 82-3. Reference numeral 83 denotes a work memory. Reference numerals 84 and 85 denote work memory access lines. Reference numeral 87 denotes a buffer register for flags added to input vector data. Reference numeral 89 denotes an instruction unit having a microprogram memory 89-1 containing the PE processing operations, a program counter 89-2, an instruction register 89-3 and an instruction decoder 89-4. Reference numeral 90 denotes a buffer register for storing input vector data $r_j$ when the data are inputted from the external I/O bus 34. Reference numerals 91, 92, 93 and 94 denote selectors which are controlled by the instruction unit 89.

The control unit 88 in each PE receives a processing start activate signal from an external control unit, and is controlled by a control flow as illustrated in FIG. 17. The control unit 88 generates a control signal for setting the initial address of the program in the program counter 89-2. Then, the control unit 88 using the transfer of the "input" flag and the "count" flag, and checks the flag $f_{5,6}$ for the 5th and 6th fields in the program (1) by judging whether or not the "input" flag is "1", and then sets this flag. In this situation, the program counter 89-2 operates, so that execution of program (1) is controlled.

When program (1) is terminated, the "input" flag is judged and if the "input" flag is "1", the flag added to the vector data $r_j$ inputted in PE is judged, so that the necessary status setting for the execution of program (2) is performed. When the "head" flag is found to be "1", then the "count" flag is judged. If the "count" flag is "0", the status previously set remains unchanged and the control unit 88 begins to control the execution of program (2).

When the "count" flag is "1", the reallocation processing status disabling flag is set to "1" in order to prepare to generate a reset signal of the reallocation processing status. The "count" flag is set to "0" and a reset signal of the reallocation processing status is transmitted. Then, in order to mask the second field of the program (2), f2 is set to "0", and the information for the starting PE is set to "1". In case that the "tail" flag is checked, the flag f3 controlling the execution of the third field of program (2) is set to "1" or "0" depending on whether the "tail" flag is "1" or not. In case that the "transfer" flag is checked, the information for the starting PE is judged and if the information is not "1", then the control unit 88 begins to control to the execution of the program (2) without changing the previous status.

If the information for the starting PE is "1", then the reallocation processing status enabling flag is set to "1" to prepare for generating a reallocation processing status, and the "count" flag is set to "1". Then, the set signal of the reallocation processing status is transmitted, and the flag f2 for controlling the execution of the second field in program (2) is set to "1". Moreover, the information for the starting PE is set to "0", and the control unit 88 begins to control the execution of the program (2).

When the flag added to the inputted vector data $r_j$ is a flag except these three types of flags, that is, a NOP flag, the reallocation processing status enabling flag is checked. If this flag is "0", then the control unit 88 begins control of the execution of program (2) without changing the previous status. When this flag is "1", the "count" flag is set to "1" in order to restart the reallocation processing, the set signal of the reallocation processing status is transmitted, flag f2 is set to "1". In addition, the information for the starting PE is set to "0".

When the "input" flag is not "1", the computations are executed using the vector data $r_j$ already stored in the PE during the execution of the program (1), so that the status settings necessary to the execution of program (2) are performed according to whether or not the set or reset signal for the reallocation processing status has been received. When the set signal has been received, the flag f2 is set to "1". When the reset signal, instead of the set signal, has been received, the flag f2 is set to "038

. When neither signal has been received, the control unit 88 begins to control execution of the program (2) without changing the previous status.

When the status settings for various cases described above are completed, the program counter 89-2 is activated, so that program (2) is executed. The control unit 88 repeats the above control procedure at every processing time.

The above embodiment allows for autonomous control in the overall array by only adding three-bit flags and by including two-bit status flags in each PE. This arrangement not only permits reduction in the load of the overall control system 57, but also allows for simplification of the control method.

A further embodiment of the control method according to the present invention will be explained for the case of obtaining a product matrix C from $(l \times k)$ matrix A and $(k \times m)$ matrix B. If $A = \{a_{ij} | 1 \leq i \leq l, 1 \leq j \leq k\}$, $B = \{b_{ij} | 1 \leq i \leq k$ and $1 \leq j \leq m\}$ and $C = \{c_{ij} | 1 \leq i \leq l, 1 \leq j \leq m\}$, then, $$c_{ij} = \sum_{p=1}^{k} a_{ip} b_{pj}. \tag{5}$$

If $a_i = (a_{i1}, a_{i2}, \ldots, a_{ik})$ and $b_j = (b_{1j}, b_{2j}, \ldots, b_{kj})$, then the above equation (5) is expressed as:

$$c_{ij} = a_i \cdot b_j. \tag{6}$$

In this equation, "." represents the inner product operator between the vectors.

Multiplication of matrix A and matrix B means obtaining $c_{ij}$ in the above equation (6) for all cases of $1 \leq i \leq l$, $1 \leq j \leq m$. An explanation will be made of that control method for the case when an array processor having $l$ ($l \leq m$) PEs in a linear array arrangement performs this manner of computation for various m, in a specific case of $l = 4$ and $m = 6$. It is now assumed here that each PE has computation functions of executing the above equation (6), functions of inputting data $a_i$, of inputting and outputting data $b_j$ and of storing and outputting the result of computations $c_{ij}$, and built-in processing instructions for performing these processing operations.

FIGS. 16A–16I show an example of the control operations when matrix multiplication is executed in an array processor with a linear arrangement.

Reference numeral 54 denotes the I/O bus for inputting data $a_i$ into the PE and for outputting the result of computation $c_{ij}$ from the PE. Reference numeral 55 denotes the path for transferring data between PEs. Reference numeral 66 denotes the status flag register consisting of the flag 67 indicating the input status of data from the I/O bus 54, and the flag 68 indicating the output status of the result of computation. Reference numeral 51 denotes the PE. $a_i$ is a column vector and $b_j$ is a row vector of matrices A and B.

In the explanation of the operations below, the flags 67 and 68 shall be referred to as follows;

Flag 67 . . . "input" flag
Flag 68 . . . "output" flag

Furthermore, the "end" flag is added to the vector $b_1$, $b_2$, $b_3$, $b_4$, $b_5$ and $b_6$. Only the "end" flag of vector $b_6$ is "1".

Initially, only the "input" flag of $PE_1$ is set to "1". At the processing time t1, $PE_1$ checks this flag and vector $a_1$ is inputted to $PE_1$ through the I/O bus 54. At the same time, vector $b_1$ is inputted from the data transfer path 55. Then, $a_1 \cdot b_1$ is computed and stored internally as data $c_{11}$. Before the initiation of the computation processing at the processing time t2, the contents of the status of the flag register 66 are transferred to the adjacent PE, and the "input" flag of $PE_2$ is set to "1". $PE_2$ judges this flag at the processing time t2 and then, at the same time as vector $a_2$ is inputted to $PE_2$ from the I/O bus 54, vector $b_1$ is inputted to $PE_2$ from $PE_1$, so that $a_2 \cdot b_1$ is calculated and stored as data $c_{21}$. At this time, in parallel with the processing in $PE_2$, vector $b_2$ is inputted to $PE_1$, and $a_1 \cdot b_2$ is calculated and stored as data $c_{12}$.

Thereafter, the same processing procedure is, repeated until the processing time t4. Before the computation processing at the processing time t5 starts, the contents of the status flag register 66 are transferred, so that the "input" flags in all the PEs are set to "0", and thus it is judged that the input from the I/O bus 54 is completed. The vectors $b_j$ are transferred to adjacent PEs at every processing time so that at the processing time t5, all PEs perform the inner product computations and accumulate the results of those computations. Prior to the start of the computation processing at the processing time t6, $PE_1$ judges that the "end" flag added to the inputted vector $b_6$ is "1", and then $PE_1$ sets the output processing status for all the computation results accumulated in that $PE_1$ including the result obtained at this time and sets the "output" flag to "1". At the same time that $PE_1$ sets the "output" flag to "1", $PE_1$ sequentially informs $PE_2$, $PE_3$ and $PE_4$ of its own processing status. $PE_2$, $PE_3$ and $PE_4$ check this status, and judge that there is a difference in the number of processing steps between PEs by the output processing of the results of computations. Under the situation even if their own processing is completed, these PEs are set to a processing stand-by status until receiving a control signal indicating that the status in $PE_1$ has been cleared. $PE_1$ resets the "output" flag when the output of the final results of computation is completed, and after confirming this reset of the flag, $PE_1$ informs all PEs that its output condition has been cleared. Then, at the processing time t7, vector $b_j$ is transferred to the adjacent PE, and $PE_2$ performs the same processing and control operations as those performed by $PE_1$ at the processing time t6. In this manner, when the processing at the processing time t9 is completed, the result of the multiplication of matrixes A and B has been obtained.

As explained above, the control method according to the present invention has the advantage of making it possible to execute autonomous matrix-multiplication processing in an array processor only by adding a one-bit flag to an input vector data and including a two-bit flag in a PE.

What is claimed is:

1. An array processor comprising:
n multipliers;
n processing elements, each one of said n processing elements being connected to the subsequent processing element through one of said n multiplexers so that said n processing elements and said n multipliers are connected in the form of a ring, each of said n processing elements including:
first input means for inputting one of input vector data $\vec{c_i}$ of a first input vector data series $\vec{C} = \{\vec{c_i}\}$ (i=1, 2, . . . , I) from one input vector data bus;
first storing means for string said one of said input vector data $c_1$;

second input means for inputting one of input vector data $\vec{r_j}$ of a second input vector data series $\vec{R} = \{\vec{r_j}\}$ (j=1, 2, . . . , N) from an I/O data bus;
second storing means for storing one of said input vector data $\vec{r_j}$;
computation means for performing predetermined computations including addition, subtraction, comparison and product-sum computation between said one of said input vector data $\vec{c_i}$ and said one of said input vector data $\vec{r_j}$;
third storing means for storing the results of the computations;
first data transfer means for transmitting one of said input vector data $\vec{c_i}$ stored in said first storing means and said computation result stored in said third storing means to an adjacent processing element;
output means for outputting as a final computation said result stored in said third storing means to said I/O bus;
second data transfer means for simultaneously transferring the respective processing results from all processing elements to respective adjacent processing elements $$\frac{(mod N)}{n}$$

times, where $$\frac{(mod N)}{n}$$

expresses the remainder when N is divided by n, in parallel with a computation processing in a respective processing element;
control means for controlling operation timings in said
first and second input means, said first, second and third storing means, said computation means, said first and second data transfer means and said output means;
each of said n multiplexers being provided for selecting either a data transfer path for the data exchange between the two processing elements connected through the multiplexer or the input data bus for providing said input vector data from an external source to the processing element associated with the respective multiplexer;
said first input means being connected directly to the output of said multiplexer so that the data transfer path of said preceding processing element or said input vector data bus can be directly connected to said first input means via said multiplexer;
said second input means being connected directly to said I/O data bus;
whereby both said input vector data series from said input vector data bus and said second input vector data series from said I/O data bus can be applied simultaneously to said processing element.

2. An array processor as claimed in claim 1, wherein:
said first input means for inputting one of vector data includes a first terminal to be coupled to a data transfer path for receiving said vector data, a first buffer register connected to said first terminal, and a first buffer memory connected to said first buffer register;

said second input means for inputting the other input vector data includes an I/O terminal coupled to said I/O bus, a second buffer register connected to said I/O terminal and a second buffer memory connected to said second buffer register;

said computation means includes a first computation unit for executing addition and subtraction and comparison computation; a second computation unit for executing product-sum computation; an accumulator register for said first computation unit; a first selector for selecting one of an output from said accumulator register; an output from said first buffer register and an internal bus; a second selector for selecting one of an output from said second buffer memory and said internal bus; a third selector for selecting one of an output from said first buffer register, said accumulator register and said second computation unit; where outputs of said first and second selectors are connected to said first computation unit; an output of a third selector is connected to a work memory; and said internal bus is connected to said first buffer memory, said first and second selectors a third buffer register and a fourth buffer register;

said second data transfer means includes a counter; a direct address access unit; a fourth selector for selecting one of a first address information from said counter and a second address information from said direct address access unit; and a portion of said work memory being connected to said fourth selector;

said first data transfer means includes said third buffer register connected to said internal bus, and a second terminal connected to said third buffer register and to be coupled to said data transfer path, for transmitting one of said input vector data and said computation result stored in said work memory;

said output means to said I/O bus includes said fourth register connected to said internal bus, and said I/O terminal; and said second control means controls said first, second, third and fourth buffer registers, said first and second buffer memories, said first and second computation units, said accumulator, said first, second, third and fourth selectors, said counter, said direct address access unit and said work memory.

3. An array processor as claimed in claim 2, wherein:

said processing element further including means for receiving status flags indicating the state of data input operation from the I/O bus and the state of simultaneous data transfer of $$\frac{(\mod N)}{n}$$

times among all processing elements from one of the adjacent processing elements, and transmitting the status flags to the adjacent processing element;

said second register including a register portion for storing tags added to the input vector data, which indicate the position of respective vector in said second input vector series data, inputted from said I/O bus; and said control means including a processing element control unit which receives said control signal from an external source, tags from said register portion and said status flags to form an instruction control signal, and a processing instruction unit which receives said instruction control signal to form said second address information and control signals for controlling said first, second, third and fourth selectors.

4. A control method of an array processor which receives a first vector data series $\vec{C}=\{\vec{c_i}\}(i=1, 2, \ldots, I)$ consisting of I first input vector data and a second vector data series $\vec{R}=\{\vec{r_j}\}(j=1, 2, \ldots, N)$ consisting of N second input vector data, and outputs a result of a predetermined computation, said control method comprising the steps of:

using an array processor having n processing elements which are connected in the form of a ring via multiplexers and into which said first input vector data and said second input vector data are inputted;

dividing said first input vector data into P groups (P is an integer equal to or larger than 1) by every n partial input vector data;

executing a predetermined processing between said n partial input vector data of each group and said second input vector data; and repeating sequentially said predetermined processing between each of said P groups and said second vector data series to produce a final processing result from said processing elements;

only one of said multiplexers transferring said first input data $c_i$; and at the same time the remaining multiplexers transferring respective outputs from preceding adjacent processing elements to the present processing elements; and said predetermined processing comprising the steps of:

inputting a series of said n first input vector data $\vec{c_i}$ into each of said processing elements via only one of said multiplexers in a pipelined fashion so that one of said processing elements receives said first input vector data $\vec{c_i}$ through the multiplexer which selects the input data bus and the others receive the input vector data $\vec{c_i}$ from the preceding adjacent processing elements;

transferring circularly once inputted, said n first input vector data $\vec{c_i}$ successively among the processing elements via all said multiplexers which select the data transfer path between the respective processing elements;

inputting each successive one of said partial input vector data of each group directly into each one of said processing elements in synchronism with the cyclical data transfer of said n first input vector data $\vec{c_i}$ in a pipelined fashion so that preceding partial input vector data $\vec{c_i}$ which are transferred cyclically among said processing elements are replaced by the successive partial input vector data $\vec{c_i}$, or inputting each one of said second input vector data $\vec{r_j}$ from an I/O data bus directly into each one of said processing elements in the sequence of said processing elements at every time and in synchronism with a timing that said partial input vector data $c_i$ is transferred cyclically among said processing elements or inputted into said processing elements;

repeatedly inputting said partial input vector data $\vec{c_i}$ in a pipelined fashion and cyclical data transfer of said input vector data $\vec{c_i}$, inputting said second vector data $\vec{r_j}$ in synchronism with the partial vector data $\vec{c_i}$ input or transfer, and transferring processing results between adjacent processing elements via said multiplexer which selects the data transfer path between adjacent processing elements; and simultaneously transferring processing parallel processed result data, which are obtained in each said processing elements among said processing elements $$\frac{(modN)}{n}$$

times in parallel with the inner processing of said processing elements when the time unit is defined as the processing between each one of said n first input vector data $\vec{c}_i$ and each one of said second input data $\vec{r}_j$, in case that processing results in one group of n first input vector data $\vec{c}_i$ and said second input vector data $\vec{r}_j$ are used for the processing of the following group of n first vector data $\vec{c}_i$ and said second input vector data $\vec{r}_j$, with $$\frac{(modN)}{n}$$

being the division remainder of the division of N by n.

5. A control method of an array processor as claimed in claim 4, wherein processing instructions are contained in said n processing elements and further comprising the steps of:

adding to said second input vector data $\vec{r}_j$ a head tag and a tail tag indicating a head position and a tail position of series of said second input vector data $\vec{r}_j$, respectively, and a transfer tag affixed to the last n input vector data $\vec{r}_j$ and indicating respective positions of said last n input vector data $\vec{r}_j$;

providing status flags showing individual processing state of data input of $\vec{r}_j$ and simultaneous data transfer of $$\left(\frac{modN}{n}\right)$$

times among all processing elements to each of said processing elements;

transferring said status flags between said processing elements;

judging said status flags so that said first and second input vector data, $c_i$ and $r_j$, are inputted into said processing element;

judging said head tag, said tail tag and said transfer tag added to the inputted second input vector data $r_j$ to change the content of the status flag in said processing element; and providing a status produced by the changed content to said processing elements; thereby performing autonomous control in the overall array processor in such a manner that a processing of each processing element is triggered by a processing instruction corresponding to said status.

* * * * *